United States Patent
Wang et al.

(10) Patent No.: US 12,328,622 B2
(45) Date of Patent: Jun. 10, 2025

(54) MBMS SERVICE COMMUNICATION METHOD AND BASE STATION

(71) Applicant: Huawei Technologies Co., Ltd., Shenzhen (CN)

(72) Inventors: Jun Wang, Shanghai (CN); Mingzeng Dai, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 397 days.

(21) Appl. No.: 17/827,351

(22) Filed: May 27, 2022

(65) Prior Publication Data

US 2022/0286918 A1 Sep. 8, 2022

Related U.S. Application Data

(63) Continuation of application No. PCT/CN2019/122067, filed on Nov. 29, 2019.

(51) Int. Cl.
*H04W 36/00* (2009.01)

(52) U.S. Cl.
CPC ................................ *H04W 36/0009* (2018.08)

(58) Field of Classification Search
CPC ..................... H04W 36/0009; H04W 36/0007; H04W 4/06
See application file for complete search history.

(56) References Cited

U.S. PATENT DOCUMENTS

| 2013/0301509 A1 | 11/2013 | Purnadi et al. |
| 2016/0345225 A1* | 11/2016 | Wang .................... H04W 76/40 |
| 2018/0160342 A1 | 6/2018 | Park et al. |

FOREIGN PATENT DOCUMENTS

| CN | 1551677 A | 12/2004 |
| CN | 101185348 A | 5/2008 |
| CN | 107920334 A | 4/2018 |
| CN | 108029048 A | 5/2018 |

OTHER PUBLICATIONS

Siemens, Telecom Italia S.p.A., Vodafone, "Assisted Cell Change during MBMS p-t-m transmission", 3GPP TSG GERAN#21, GP-042013, Aug. 23-27, 2004, 9 pages, Montreal, Canada.

3GPP TS 22.186 V16.2.0 (Jun. 2019), 3rd Generation Partnership Project; Technical Specification Group Services and System Aspects; Enhancement of 3GPP support for V2X scenarios; Stage 1(Release 16), 18 pages.

3GPP TR 22.886 V16.2.0 (Dec. 2018), 3rd Generation Partnership Project; Technical Specification Group Services and System Aspects; Study on enhancement of 3GPP Support for 5G V2X Services(Release 16), 76 pages.

* cited by examiner

*Primary Examiner* — Joseph E Dean, Jr.
(74) *Attorney, Agent, or Firm* — Slater Matsil, LLP

(57) ABSTRACT

Embodiments of this application provide an MBMS service communication method and a base station, and relate to the communication field. The method includes: A source base station obtains first group identity information of an MBMS service of a terminal device in a neighboring cell; and the source base station sends the first group identity information to the terminal device. In this application, after moving to or accessing the neighboring cell, the terminal device may continue to receive service content and information of the MBMS service based on the first group identity information that is of the MBMS service in the neighboring cell and that is obtained from the source base station.

20 Claims, 11 Drawing Sheets

MBMS SERVICE COMMUNICATION METHOD AND BASE STATION

CROSS-REFERENCE TO RELATED APPLICATIONS

This application is a continuation of International Application No. PCT/CN2019/122067, filed on Nov. 29, 2019, the disclosure of which is hereby incorporated by reference in its entirety.

TECHNICAL FIELD

Embodiments of this application relate to the field of communication technologies, and in particular, to an MBMS service communication method and a base station.

BACKGROUND

Currently, to meet a requirement of a plurality of users in a network for watching same content at the same time, the network may use a broadcast or multicast manner to consume one air interface resource, to ensure air interface efficiency. In an existing standard, a long term evolution (LTE) broadcast/multicast service is a multimedia broadcast multicast service (MBMS). An MBMS technology is based on a single frequency network (SFN). A principle of the MBMS technology is that a plurality of cells that are geographically close belong to a same multimedia broadcast multicast service single frequency network area (MBSFN area), and all cells in the same MBSFN area broadcast same content on a same time-frequency resource at a same moment.

However, because an MBMS system based on an MBSFN area has a feature of static division and cannot be dynamically time-varying, for a requirement of some small-range group communication (for example, broadcast or multicast only in one cell), even if there is no requirement of receiving services by terminals in most cells, these services are still broadcast in all cells in the MBSFN area. Therefore, a solution of enhanced single-cell point-to-multipoint (Single Cell Point to Multipoint transmission, SC-PTM) based on cell multicast/broadcast is proposed in a conventional technology.

Specifically, according to the SC-PTM that is based on a single-cell multicast/broadcast mechanism, in a single cell, service content can be sent to all terminal users in the cell who expect to receive a same service/service (for example, watch CCTV-1 at the same time), and only one air interface resource is consumed.

However, the SC-PTM mechanism in the conventional technology is based on a predefined service. For example, each cell has configured a corresponding SC-PTM G-RNTI for a predefined service. It may be understood as that for the predefined service, each cell stores a mapping relationship between service identity information, for example, a service ID, and an SC-PTM group radio network temporary identifier (G-RNTI). A base station broadcasts the mapping relationship between a service ID of a predefined service and an SC-PTM G-RNTI in each cell. A terminal may monitor broadcast of a cell, to obtain a G-RNTI corresponding to an interesting service, and listen to, in the cell based on the G-RNTI, content and information corresponding to the service.

In an SC-PTM scenario in the conventional technology, each cell broadcasts a correspondence between broadcast/multicast service identity information and a G-RNTI in the cell. When a terminal is interested in a service, the terminal may obtain a G-RNTI of the service in the cell based on broadcast content in the cell. Therefore, when moving between two neighboring cells, a terminal in a connected state needs to first hand over to a target cell and read broadcast information in the target cell, to obtain a G-RNTI of a service in which the terminal is interested, and continue to receive service information of the service in the target cell based on the G-RNTI. Consequently, a service interruption delay during the handover is large. After moving to a new cell, a terminal in an idle state also needs to read broadcast information to obtain corresponding configuration information, so that the terminal can continue to receive service information of a service. Therefore, there is also a problem that a service interruption delay is large.

In addition, some multicast services cannot be predefined. It may also be understood as that this type of multicast service is temporarily established group communication, and configuration information corresponding to the multicast service cannot be pre-configured in each cell based on a predefined service. For example, the configuration information includes a G-RNTI. Each cell can temporarily configure an unoccupied G-RNTI for the multicast service based only on a temporary service requirement, for example, if a multicast service needs to be added, and broadcasts, in broadcast information, a mapping relationship between multicast service identity information and the G-RNTI. That is, after a terminal accesses the target cell, the target cell configures a corresponding G-RNTI for a service in which the terminal is interested, and broadcasts a correspondence between a service ID of the service and the G-RNTI. After reading the broadcast information, the terminal may obtain the G-RNTI of the interesting multicast service in the cell, and obtain service content of the multicast service in the cell based on the G-RNTI. This further increases a service interruption delay. It should be noted that, if the terminal is in an idle state, the cell obtains an MBMS service in which the terminal is interested only after the terminal in the idle state accesses the cell. That is, for the terminal in the idle state, an interruption delay of multicast communication is further increased.

SUMMARY

This application provides an MBMS service communication method and a base station, to improve continuity and reliability of an MBMS service to some extent.

To achieve the foregoing objective, this application uses the following technical solutions.

According to a first aspect, an embodiment of this application provides an MBMS service communication method. The method includes: A source base station obtains first group identity information of an MBMS service of a terminal device in a neighboring cell; and then, the source base station may send the first group identity information to the terminal device. In this way, after moving to or accessing the neighboring cell, the terminal device may continue to receive service content and information of the MBMS service based on the first group identity information that is of the MBMS service in the neighboring cell and that is obtained from the source base station, thereby effectively improving service continuity and reliability.

In a possible implementation, if the neighboring cell belongs to a target base station, that a source base station obtains first group identity information of an MBMS service of a terminal device in a neighboring cell may include: The source base station requests group identity information of the MBMS service in the neighboring cell from the target base station; and then, the source base station may obtain the first group identity information, indicated by the target base station to the source base station, of the MBMS service in the neighboring cell.

Based on the foregoing implementation, the source base station may request group identity information of the MBMS service in the target base station from the target base station, to implement negotiation with the target base station and obtain the group identity information of the MBMS service in the neighboring cell. Optionally, the source base station may trigger, by sending a request to the target base station, the target base station to configure group identity information for the MBMS service.

In a possible implementation, that the source base station requests group identity information of the MBMS service in the neighboring cell from the target base station may include: The source base station sends request information to the target base station, where the request information includes second group identity information and is used to indicate that the second group identity information is group identity information of the MBMS service in a source cell, and the source cell belongs to the source base station. Correspondingly, that the source base station obtains the first group identity information, indicated by the target base station, of the MBMS service in the neighboring cell may include: The source base station receives first indication information sent by the target base station, where the first indication information is used to indicate that the first group identity information is the same as the second group identity information.

Based on the foregoing implementation, the source base station may recommend the group identity information of the MBMS service in the source cell to the neighboring cell, that is, group identity information currently used by the terminal device. In this case, the group identity information of the MBMS service in the neighboring cell may be the same as the group identity information of the MBMS service in the source cell. Therefore, the terminal device can continue to receive, in the neighboring cell, service content and information of the MBMS service based on the currently used group identity information (that is, the group identity information of the MBMS service in the source cell), thereby reducing a handover process inside the terminal device.

In a possible implementation, that the source base station requests group identity information of the MBMS service in the neighboring cell from the target base station includes: The source base station sends request information to the target base station, where the request information includes second group identity information and is used to indicate that the second group identity information is group identity information of the MBMS service in a source cell, and the source cell belongs to the source base station. That the source base station obtains the first group identity information, indicated by the target base station, of the MBMS service in the neighboring cell includes: The source base station receives second indication information sent by the target base station, where the second indication information includes the first group identity information, and the first group identity information is different from the second group identity information.

Based on the foregoing implementation, the source base station may recommend the group identity information of the MBMS service in the source cell to the neighboring cell, that is, group identity information currently used by the terminal device, to keep the group identity information of the MBMS service in the neighboring cell the same as the group identity information of the MBMS service in the source cell. Optionally, if group identity information the same as that in the source cell is not supported in being configured in the neighboring cell for the MBMS service, the target base station may configure group identity information, that is, the first group identity information, in the neighboring cell for the MBMS service, and send the first group identity information to the source base station. Therefore, the terminal device can continue to receive, in the neighboring cell, service content and information of the MBMS service based on the first group identity information.

In a possible implementation, the request information is sent by the source base station to the target base station after the source base station configures the second group identity information for the MBMS service; the request information is sent after the terminal device accesses the source base station and before the source base station configures the second group identity information for the MBMS service; or the request information is sent by the source base station to the target base station after the source base station determines, based on a measurement report reported by the terminal device, that the terminal device needs to perform cell handover.

Based on the foregoing implementation, the source terminal may negotiate with the target base station on different occasions before the terminal moves to or accesses the neighboring cell, to indicate the group identity information of the MBMS service in the neighboring cell to the terminal device before the terminal device moves to or accesses the neighboring cell.

In a possible implementation, the neighboring cell includes a target cell, the target cell is a cell that is determined based on the measurement report reported by the terminal device and that may be used to serve the terminal device, and the measurement report includes a measurement result of each terminal device in an MBMS service group to which the terminal device belongs.

Based on the foregoing implementation, an object negotiated with the source base station may be base stations corresponding to all neighboring cells, or an object negotiated with the source base station may be a base station to which at least one target cell determined based on the measurement report of the terminal device belongs. Optionally, in a handover scenario, the source base station may further select, from target cells, a handover cell to which the terminal needs to be handed over, and negotiate with a base station to which the handover cell belongs.

Optionally, in a single-user scenario, the measurement report reported by the terminal device may include only a result of measuring the neighboring cell by the terminal device. Optionally, in a group communication scenario, the terminal device may be used as an anchor terminal, and the measurement report reported by the terminal device includes a result of measuring the neighboring cell by each terminal device in the MBMS service group to which the terminal device belongs.

In a possible implementation, that the source base station sends the first group identity information to the terminal device includes: The source base station sends a first group identity list to the terminal, where the first group identity list includes cell identity information of each of at least one neighboring cell and the first group identity information of the MBMS service in the neighboring cell.

Based on the foregoing implementation, if the source base station receives group identity information, sent by the at least one neighboring cell, of the MBMS service in the at least one neighboring cell, the source terminal may send a plurality of pieces of obtained group identity information to the terminal device by using a list, and indicate a correspondence between group identity information and a neighboring cell in the list.

Optionally, if the first group identity information of the MBMS service in the neighboring cell is the same as the group identity information of the MBMS service in the source cell, the first group identity information list may include only cell identity information of the neighboring cell, or include cell identity information of the neighboring cell and first indication information.

In a possible implementation, that the source base station sends the first group identity information to the terminal device includes: The source base station sends, to the terminal, area identity information of a valid area to which the neighboring cell belongs and group identity information of the MBMS service in the valid area, where the group identity information of the MBMS service in all cells in the valid area is the same.

Based on the foregoing implementation, the source base station may indicate group identity information of the MBMS service in at least one neighboring cell (namely, a neighboring cell in the valid area) to the terminal device by indicating the area identity information to the terminal device.

In a possible implementation, that the source base station sends the first group identity information to the terminal device includes: The source base station sends third indication information to the terminal device, where the third indication information is used to indicate that first group identity information of the MBMS service group in the neighboring cell is the same as second group identity information of the MBMS service group in the source cell.

Based on the foregoing implementation, the source base station may indicate, to the terminal device, that the group identity information of the MBMS service in the neighboring cell is the same as that in the source cell, so that the terminal device can continue to receive, in the neighboring cell, service content and information of the MBMS service based on the group identity information currently used in the source cell.

In a possible implementation, that the source base station sends the first group identity information to the terminal device includes: The source base station sends fourth indication information to the terminal device, where the fourth indication information includes cell identity information of the neighboring cell and the corresponding first group identity information.

Based on the foregoing implementation, the source base station may send the first group identity information of the MBMS service in the neighboring cell to the terminal device, so that after moving to or accessing the neighboring cell, the terminal device switches group identity information currently used by the terminal device, and continue to receive, in the neighboring cell, service content and information of the MBMS service based on the first group identity information.

In a possible implementation, the first group identity information includes a group radio network temporary identifier G-RNTI, or the first group identity information is a temporary mobile group identity TMGI.

According to a second aspect, an embodiment of this application provides an MBMS communication method. The method may include: A target base station receives request information sent by a source base station, where the request information is used to request, from the target base station, group identity information of an MBMS service in a neighboring cell of the target base station; and the target base station indicates first group identity information of the MBMS service in the neighboring cell to the source base station based on the request information.

In a possible implementation, that the target base station indicates first group identity information of the MBMS service in the neighboring cell to the source base station based on the request information includes: sending first indication information to the source base station if the target base station detects that the first group identity information configured for the MBMS already exists, where the first indication information includes the first group identity information.

Based on the foregoing implementation, after receiving the request information sent by the source base station, the target base station may send the stored group identity information of the MBMS service in the neighboring cell to the source base station.

In a possible implementation, that the target base station indicates first group identity information of the MBMS service in the neighboring cell to the source base station based on the request information includes: if the target base station does not detect group identity information configured for the MBMS, configuring the first group identity information for the MBMS, and sending second indication information to the source base station, where the second indication information includes the first group identity information.

Based on the foregoing implementation, after receiving the request information sent by the source base station, the target base station may trigger an action of configuring the group identity information for the MBMS service, and send the configured group identity information of the MBMS service in the neighboring cell to the source base station.

In a possible implementation, the request information includes second group identity information and is used to indicate that the second group identity information is group identity information of the MBMS service in a source cell; and the indicating first group identity information of the MBMS service in the neighboring cell to the source base station based on the request information includes: The target base station determines, based on the request information, whether to accept that the group identity information of the MBMS service in the neighboring cell is the same as the second group identity information; and if it is determined to accept that the group identity information is the same as the second group identity information, the target base station sends third indication information to the source base station, where the third indication information is used to indicate that the first group identity information is the same as the second group identity information.

In a possible implementation, the request information includes second group identity information and is used to indicate that the second group identity information is group identity information of the MBMS service in a source cell; and the indicating first group identity information of the MBMS service in the neighboring cell to the source base station based on the request information includes: The target base station determines, based on the request information, whether to accept that the group identity information of the MBMS service in the neighboring cell is the same as the second group identity information; if it is determined not to accept that the group identity information is the same as the second group identity information, the target base station configures the first group identity information for the MBMS service, where the first group identity information is different from the second group identity information; and the target base station sends fourth indication information to the source base station, where the fourth indication information includes the first group identity information.

In a possible implementation, the first group identity information includes a group radio network temporary identifier G-RNTI, or the first group identity information is a temporary mobile group identity TMGI.

According to a third aspect, an embodiment of this application provides an MBMS service communication method. The method includes: A terminal device receives, in a source cell, service information of an MBMS service based on first group identity information; the terminal device obtains second group identity information indicated by a source base station to which the source cell belongs, where the second group identity information is group identity information of the MBMS service in a neighboring cell; and the terminal device receives, in the neighboring cell, the service information of the MBMS service based on the second group identity information.

In a possible implementation, that the terminal device obtains second group identity information indicated by a source base station to which the source cell belongs includes: The terminal device receives first indication information sent by the source base station, where the first indication information is used to indicate that the group identity information of the MBMS service in the neighboring cell is the same as the first group identity information of the MBMS service in the source cell; and the terminal device may receive, in the neighboring cell, the service information of the MBMS service based on the second group identity information that is the same as the first group identity information.

In a possible implementation, that the terminal device obtains second group identity information indicated by a source base station to which the source cell belongs includes: The terminal device receives second indication information sent by the source base station, where the second indication information includes the second group identity information of the MBMS service in the neighboring cell; and the terminal device may receive, in the neighboring cell, the service information of the MBMS service based on the second group identity information.

In a possible implementation, that the terminal device obtains second group identity information indicated by a source base station to which the source cell belongs includes: The terminal device receives a second group identity information list sent by the source base station, where the second group identity information list includes cell identity information of at least one neighboring cell and group identity information of the MBMS service in the neighboring cell; and after accessing or moving to a target cell, the terminal device may match cell identity information of the target cell with the cell identity information of the at least one neighboring cell in the second group identity information list; and if the matching succeeds, obtain second group identity information corresponding to successfully matched cell identity information, and receive, in the target cell, the service information of the MBMS service based on the second group identity information.

In a possible implementation, that the terminal device obtains second group identity information indicated by a source base station to which the source cell belongs includes: The terminal device receives a second group identity information list sent by the source base station, where the second group identity information list includes a second group identity information sublist of at least one member terminal in an MBMS service group to which the terminal device belongs; and the terminal device sends the second group identity information sublist to the corresponding member terminal. The second group identity information sublist includes identity information of at least one neighboring cell and group identity information of the MBMS service in the neighboring cell.

According to a fourth aspect, an embodiment of this application provides a base station, including a memory and a processor. The memory is coupled to the processor. The memory is configured to store program instructions. When the program instructions are executed by the processor, the base station is enabled to perform the following steps: obtaining first group identity information of an MBMS service of a terminal device in a neighboring cell; and sending the first group identity information to the terminal device.

In a possible implementation, if the neighboring cell belongs to a target base station, when the program instructions are executed by the processor, the base station is enabled to perform the following steps: requesting group identity information of the MBMS service in the neighboring cell from the target base station; and obtaining the first group identity information, indicated by the target base station, of the MBMS service in the neighboring cell.

In a possible implementation, when the program instructions are executed by the processor, the base station is enabled to perform the following step: sending request information to the target base station, where the request information includes second group identity information and is used to indicate that the second group identity information is group identity information of the MBMS service in a source cell, and the source cell belongs to the source base station; and the obtaining the first group identity information, indicated by the target base station, of the MBMS service in the neighboring cell includes: receiving first indication information sent by the target base station, where the first indication information is used to indicate that the first group identity information is the same as the second group identity information.

In a possible implementation, when the program instructions are executed by the processor, the base station is enabled to perform the following step: sending request information to the target base station, where the request information includes second group identity information and is used to indicate that the second group identity information is group identity information of the MBMS service in a source cell, and the source cell belongs to the source base station; and the obtaining the first group identity information, indicated by the target base station, of the MBMS service in the neighboring cell includes: receiving second indication information sent by the target base station, where the second indication information includes the first group identity information, and the first group identity information is different from the second group identity information.

In a possible implementation, the request information is sent by the base station to the target base station after the base station configures the second group identity information for the MBMS service; the request information is sent after the terminal device accesses the base station and before the base station configures the second group identity information for the MBMS service; or the request information is sent by the base station to the target base station after the base station determines, based on a measurement report reported by the terminal device, that the terminal device needs to perform cell handover.

In a possible implementation, the neighboring cell includes a target cell, the target cell is a cell that is determined based on the measurement report reported by the terminal device and that may be used to serve the terminal device, and the measurement report includes a measurement result of each terminal device in an MBMS service group to which the terminal device belongs.

In a possible implementation, when the program instructions are executed by the processor, the base station is enabled to perform the following step: sending third indication information to the terminal device, where the third indication information is used to indicate that first group identity information of the MBMS service group in the neighboring cell is the same as second group identity information of the MBMS service group in the source cell.

In a possible implementation, when the program instructions are executed by the processor, the base station is enabled to perform the following step: sending fourth indication information to the terminal device, where the fourth indication information includes cell identity information of the neighboring cell and the corresponding first group identity information.

In a possible implementation, the first group identity information includes a group radio network temporary identifier G-RNTI, or the first group identity information is a temporary mobile group identity TMGI.

According to a fifth aspect, an embodiment of this application provides a base station, including a memory and a processor. The memory is coupled to the processor. The memory is configured to store program instructions. When the program instructions are executed by the processor, the base station is enabled to perform the following steps: receiving request information sent by a source base station, where the request information is used to request, from the target base station, group identity information of an MBMS service in a neighboring cell of the target base station; and indicating first group identity information of the MBMS service in the neighboring cell to the source base station based on the request information.

In a possible implementation, when the program instructions are executed by the processor, the base station is enabled to perform the following step: sending first indication information to the source base station if the base station detects that the first group identity information configured for the MBMS exists, where the first indication information includes the first group identity information.

In a possible implementation, when the program instructions are executed by the processor, the base station is enabled to perform the following step: if the base station does not detect group identity information configured for the MBMS, configuring the first group identity information for the MBMS, and sending second indication information to the source base station, where the second indication information includes the first group identity information.

In a possible implementation, the request information includes second group identity information and is used to indicate that the second group identity information is group identity information of the MBMS service in a source cell; and when the program instructions are executed by the processor, the base station is enabled to perform the following steps: determining, based on the request information, whether to accept that the group identity information of the MBMS service in the neighboring cell is the same as the second group identity information; and if it is determined to accept that the group identity information is the same as the second group identity information, the target base station sends third indication information to the source base station, where the third indication information is used to indicate that the first group identity information is the same as the second group identity information.

In a possible implementation, the request information includes second group identity information and is used to indicate that the second group identity information is group identity information of the MBMS service in a source cell; and when the program instructions are executed by the processor, the base station is enabled to perform the following steps: determining, based on the request information, whether to accept that the group identity information of the MBMS service in the neighboring cell is the same as the second group identity information; if it is determined not to accept that the group identity information is the same as the second group identity information, the target base station configures the first group identity information for the MBMS service, where the first group identity information is different from the second group identity information; and sending fourth indication information to the source base station, where the fourth indication information includes the first group identity information.

In a possible implementation, the first group identity information includes a group radio network temporary identifier G-RNTI, or the first group identity information is a temporary mobile group identity TMGI.

According to a sixth aspect, an embodiment of this application provides a terminal, where the terminal includes a memory and a processor. The memory is coupled to the processor. The memory is configured to store program instructions. When the program instructions are executed by the processor, the terminal is enabled to perform the following steps: receiving, in a source cell, service information of an MBMS service based on first group identity information; obtaining second group identity information indicated by a source base station to which the source cell belongs, where the second group identity information is group identity information of the MBMS service in a neighboring cell; and receiving, in the neighboring cell, the service information of the MBMS service based on the second group identity information.

In a possible implementation, when the program instructions are executed by the processor, the terminal is enabled to perform the following steps: receiving first indication information sent by the source base station, where the first indication information is used to indicate that the group identity information of the MBMS service in the neighboring cell is the same as the first group identity information of the MBMS service in the source cell; and receiving, in the neighboring cell, the service information of the MBMS service based on the second group identity information that is the same as the first group identity information.

In a possible implementation, when the program instructions are executed by the processor, the terminal is enabled to perform the following steps: receiving second indication information sent by the source base station, where the second indication information includes the second group identity information of the MBMS service in the neighboring cell; and receiving, in the neighboring cell, the service information of the MBMS service based on the second group identity information.

In a possible implementation, when the program instructions are executed by the processor, the terminal is enabled to perform the following steps: receiving a second group identity information list sent by the source base station, where the second group identity information list includes cell identity information of at least one neighboring cell and group identity information of the MBMS service in the neighboring cell; and after the terminal accesses or moves to a target cell, matching cell identity information of the target cell with the cell identity information of the at least one neighboring cell in the second group identity information list; and if the matching succeeds, obtaining second group identity information corresponding to successfully matched cell identity information, and receiving, in the target cell, the service information of the MBMS service based on the second group identity information.

In a possible implementation, when the program instructions are executed by the processor, the terminal is enabled to perform the following steps: receiving a second group identity information list sent by the source base station, where the second group identity information list includes a second group identity information sublist of at least one member terminal in an MBMS service group to which the terminal device belongs; and sending the second group identity information sublist to the corresponding member terminal. The second group identity information sublist includes identity information of at least one neighboring cell and group identity information of the MBMS service in the neighboring cell.

According to a seventh aspect, an embodiment of this application provides an apparatus. The apparatus includes an obtaining module and a sending module. The obtaining module is configured to obtain first group identity information of an MBMS service of a terminal device in a neighboring cell. The sending module is configured to send the first group identity information to the terminal device.

In a possible implementation, if the neighboring cell belongs to a target base station, the obtaining module is specifically configured to: request group identity information of the MBMS service in the neighboring cell from the target base station; and obtain the first group identity information, indicated by the target base station, of the MBMS service in the neighboring cell.

In a possible implementation, the obtaining module is specifically configured to: send request information to the target base station, where the request information includes second group identity information and is used to indicate that the second group identity information is group identity information of the MBMS service in a source cell, and the source cell belongs to a source base station; and receive first indication information sent by the target base station, where the first indication information is used to indicate that the first group identity information is the same as the second group identity information.

In a possible implementation, the obtaining module is specifically configured to: send request information to the target base station, where the request information includes second group identity information and is used to indicate that the second group identity information is group identity information of the MBMS service in a source cell, and the source cell belongs to a source base station; and receive second indication information sent by the target base station, where the second indication information includes the first group identity information, and the first group identity information is different from the second group identity information.

In a possible implementation, the request information is sent by the source base station to the target base station after the source base station configures the second group identity information for the MBMS service; the request information is sent after the terminal device accesses the source base station and before the source base station configures the second group identity information for the MBMS service; or the request information is sent by the source base station to the target base station after the source base station determines, based on a measurement report reported by the terminal device, that the terminal device needs to perform cell handover.

In a possible implementation, the neighboring cell includes a target cell, the target cell is a cell that is determined based on the measurement report reported by the terminal device and that may be used to serve the terminal device, and the measurement report includes a measurement result of each terminal device in an MBMS service group to which the terminal device belongs.

In a possible implementation, the sending module is specifically configured to send third indication information to the terminal device, where the third indication information is used to indicate that first group identity information of the MBMS service group in the neighboring cell is the same as second group identity information of the MBMS service group in the source cell.

In a possible implementation, the sending module is specifically configured to send fourth indication information to the terminal device, where the fourth indication information includes cell identity information of the neighboring cell and the corresponding first group identity information.

In a possible implementation, the first group identity information includes a group radio network temporary identifier G-RNTI, or the first group identity information is a temporary mobile group identity TMGI.

According to an eighth aspect, an embodiment of this application provides an apparatus. The apparatus includes a transceiver module, configured to receive request information sent by a source base station, where the request information is used to request, from a target base station, group identity information of an MBMS service in a neighboring cell of the target base station; and indicating first group identity information of the MBMS service in the neighboring cell to the source base station based on the request information.

In a possible implementation, the transceiver module is specifically configured to send first indication information to the source base station if the apparatus detects that the first group identity information configured for the MBMS exists, where the first indication information includes the first group identity information.

In a possible implementation, the apparatus further includes a processing module, configured to: if the target base station does not detect group identity information configured for the MBMS, configure the first group identity information for the MBMS. The transceiver module is further configured to send second indication information to the source base station, where the second indication information includes the first group identity information.

In a possible implementation, the request information includes second group identity information and is used to indicate that the second group identity information is group identity information of the MBMS service in a source cell. The apparatus includes a processing module, configured to determine, based on the request information, whether to accept that the group identity information of the MBMS service in the neighboring cell is the same as the second group identity information. If the processing module determines that the group identity information is the same as the second group identity information, the transceiver module is configured to send third indication information to the source base station, where the third indication information is used to indicate that the first group identity information is the same as the second group identity information.

In a possible implementation, the request information includes second group identity information and is used to indicate that the second group identity information is group identity information of the MBMS service in a source cell. The processing module is configured to determine, based on the request information, whether to accept that the group identity information of the MBMS service in the neighboring cell is the same as the second group identity information. If the processing module determines not to accept that the group identity information is the same as the second group identity information, the processing module configures the first group identity information for the MBMS service, where the first group identity information is different from the second group identity information; and the transceiver module is configured to send fourth indication information to the source base station, where the fourth indication information includes the first group identity information.

In a possible implementation, the first group identity information includes a group radio network temporary identifier G-RNTI, or the first group identity information is a temporary mobile group identity TMGI.

According to a ninth aspect, an embodiment of this application provides an apparatus. The apparatus includes: a transceiver module, configured to receive, in a source cell, service information of an MBMS service based on first group identity information. The transceiver module is further configured to: obtain second group identity information indicated by a source base station to which the source cell belongs, where the second group identity information is group identity information of the MBMS service in a neighboring cell; and receive, in the neighboring cell, the service information of the MBMS service based on the second group identity information.

In a possible implementation, the transceiver module is further configured to: receive first indication information sent by the source base station, where the first indication information is used to indicate that the group identity information of the MBMS service in the neighboring cell is the same as the first group identity information of the MBMS service in the source cell; and receive, in the neighboring cell, the service information of the MBMS service based on the second group identity information that is the same as the first group identity information.

In a possible implementation, the transceiver module is further configured to: receive second indication information sent by the source base station, where the second indication information includes the second group identity information of the MBMS service in the neighboring cell; and receive, in the neighboring cell, the service information of the MBMS service based on the second group identity information.

In a possible implementation, the transceiver module is further configured to: receive a second group identity information list sent by the source base station, where the second group identity information list includes cell identity information of at least one neighboring cell and group identity information of the MBMS service in the neighboring cell; and after the terminal device accesses or moves to a target cell, match cell identity information of the target cell with the cell identity information of the at least one neighboring cell in the second group identity information list; and if the matching succeeds, obtain second group identity information corresponding to successfully matched cell identity information, and receive, in the target cell, the service information of the MBMS service based on the second group identity information.

In a possible implementation, the transceiver module is further configured to: receive a second group identity information list sent by the source base station, where the second group identity information list includes a second group identity information sublist of at least one member terminal in an MBMS service group to which the terminal device belongs; and send the second group identity information sublist to the corresponding member terminal. The second group identity information sublist includes identity information of at least one neighboring cell and group identity information of the MBMS service in the neighboring cell.

According to a tenth aspect, an embodiment of this application provides a computer-readable medium, configured to store a computer program. The computer program includes instructions for performing the method according to any one of the first aspect or the possible implementations of the first aspect.

According to an eleventh aspect, an embodiment of this application provides a computer-readable medium, configured to store a computer program. The computer program includes instructions for performing the method according to any one of the second aspect or the possible implementations of the second aspect.

According to a twelfth aspect, an embodiment of this application provides a computer-readable medium, configured to store a computer program. The computer program includes instructions for performing the method according to any one of the third aspect or the possible implementation of the third aspect.

According to a thirteenth aspect, an embodiment of this application provides a computer program. The computer program includes instructions for performing the method according to any one of the first aspect or the possible implementations of the first aspect.

According to a fourteenth aspect, an embodiment of this application provides a computer program. The computer program includes instructions for performing the method according to any one of the second aspect or the possible implementations of the second aspect.

According to a fifteenth aspect, an embodiment of this application provides a computer program. The computer program includes instructions for performing the method according to any one of the third aspect or the possible implementations of the third aspect.

According to a sixteenth aspect, an embodiment of this application provides a chip. The chip includes a processing circuit and a transceiver pin. The transceiver pin and the processing circuit communicate with each other by using an internal connection path. The processing circuit performs the method according to any one of the first aspect or the possible implementations of the first aspect, to control a receive pin to receive a signal and a transmit pin to send a signal.

According to a seventeenth aspect, an embodiment of this application provides a chip. The chip includes a processing circuit and a transceiver pin. The transceiver pin and the processing circuit communicate with each other by using an internal connection path. The processing circuit performs the method according to any one of the second aspect or the possible implementations of the second aspect, to control a receive pin to receive a signal and a transmit pin to send a signal.

According to an eighteenth aspect, an embodiment of this application provides a chip. The chip includes a processing circuit and a transceiver pin. The transceiver pin and the processing circuit communicate with each other by using an internal connection path. The processing circuit performs the method according to any one of the third aspect or the possible implementation of the third aspect, to control a receive pin to receive a signal and a transmit pin to send a signal.

According to a nineteenth aspect, an embodiment of this application further provides a communication system, including the foregoing source base station and target base station.

BRIEF DESCRIPTION OF THE DRAWINGS

To describe the technical solutions in embodiments of this application more clearly, the following briefly describes the accompanying drawings for describing embodiments of this application. It is clear that the accompanying drawings in the following description show merely some embodiments of this application, and a person of ordinary skill in the art may derive other drawings from these accompanying drawings without creative efforts.

DETAILED DESCRIPTION OF ILLUSTRATIVE EMBODIMENTS

The following clearly and completely describes the technical solutions in embodiments of this application with reference to the accompanying drawings in embodiments of this application. Clearly, the described embodiments are some but not all of embodiments of this application. All other embodiments obtained by a person of ordinary skill in the art based on embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and the like are intended to distinguish between different objects but do not indicate a particular order of the objects. For example, a first target object, a second target object, and the like are intended to distinguish between different target objects but do not indicate a particular order of the target objects.

In embodiments of this application, the word "example", "for example", or the like is used to represent giving an example, an illustration, or a description. Any embodiment or design scheme described as an "example" or with "for example" in embodiments of this application should not be explained as being more preferred or having more advantages than another embodiment or design scheme. Exactly, use of the word "example", "for example", or the like is intended to present a related concept in a specific manner.

In the description of embodiments of this application, unless otherwise stated, "a plurality of" means two or more than two. For example, a plurality of processing units are two or more processing units. A plurality of systems are two or more systems.

To make a person skilled in the art better understand this application, the following briefly describes technologies related to a multicast service in this application.

Figure 1:
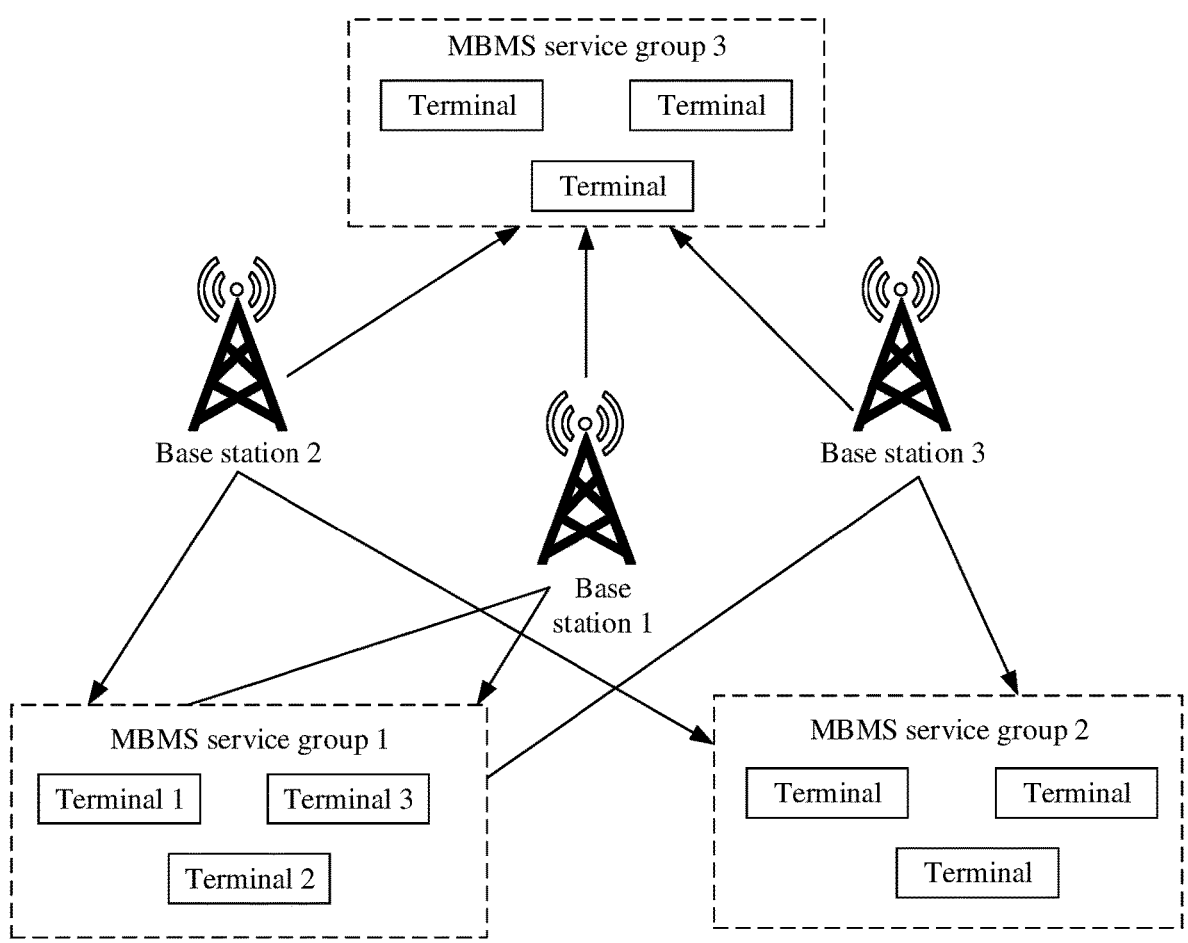
FIG. 1 is a schematic diagram of a communication system according to an embodiment of this application.

Before the technical solutions in embodiments of this application are described, a communication system in embodiments of this application is first described with reference to the accompanying drawings. FIG. 1 is a schematic diagram of a communication system according to an embodiment of this application. The communication system includes a base station 1, a base station 2, a base station 3, and a plurality of MBMS service groups, including an MBMS service group 1, an MBMS service group 2, and an MBMS service group 3. Each MBMS service group includes one or more terminals. The MBMS service group 1 is used as an example. The service group includes a terminal 1, a terminal 2, and a terminal 3. It should be noted that in an actual application scenario, there may be one or more base stations and one or more MBMS service groups. Quantities in FIG. 1 are merely examples. This is not limited in this application.

The communication system may be used to support a fourth generation (4G) access technology, for example, a long term evolution (LTE) access technology. Alternatively, the communication system may support a fifth generation (5G) access technology, for example, a new radio (NR) access technology. Alternatively, the communication system may be used to support a third generation (3G) access technology, for example, a universal mobile telecommunications system (UMTS) access technology. Alternatively, the communication system may be used to support a second generation (2G) access technology, for example, a global system for mobile communications (GSM) access technology. Alternatively, the communication system may be a communication system that supports a plurality of wireless technologies, for example, an LTE technology and an NR technology. In addition, the communication system may be applied to a narrowband Internet of things (Narrow Band Internet of Things, NB-IoT) system, an enhanced data rates for GSM evolution (EDGE) system, a wideband code division multiple access (WCDMA) system, a code division multiple access 2000 (CDMA 2000) system, a time divisionsynchronous code division multiple access (TD-SCDMA) system, a long term evolution (LTE) system, and a future-oriented communication technology.

In addition, the base station (including a source base station and a target base station) in FIG. 1 may be configured to support terminal access, for example, a base transceiver station (BTS) and a base station controller (BSC) in a communication system supporting a 2G access technology, a NodeB and a radio network controller (RNC) in a communication system supporting a 3G access technology, and an evolved NodeB (eNB) in a communication system supporting a 4G access technology, or a next generation NodeB (gNB), a transmission reception point (TRP), a relay node, or an access point (AP) in a communication system supporting a 5G access technology. For ease of description, in all embodiments of this application, all apparatuses that provide a wireless communication function for a terminal are referred to as network devices or base stations.

The terminal in FIG. 1 may be a device that provides voice or data connectivity for a user, and may also be referred to as, for example, a mobile station, a subscriber unit, a station, or terminal equipment (TE). The terminal may be a cellular phone, a personal digital assistant (PDA), a radio modem, a handheld device, a laptop computer, a cordless phone, a wireless local loop (WLL) station, a tablet (pad), or the like. With development of wireless communication technologies, a device that can access a communication system, a device that can communicate with a network side in the communication system, or a device that can communicate with another object by using the communication system may be the terminal in embodiments of this application, for example, a terminal and a vehicle in intelligent transportation, a household device in a smart household, an electricity meter reading instrument in a smart grid, a voltage monitoring instrument, an environment monitoring instrument, a video surveillance instrument in an intelligent security network, or a cashing machine. In embodiments of this application, the terminal may communicate with a base station, for example, the base station in FIG. 1. A plurality of terminals may communicate with each other. The terminal may be stationary or mobile.

Figure 2A:
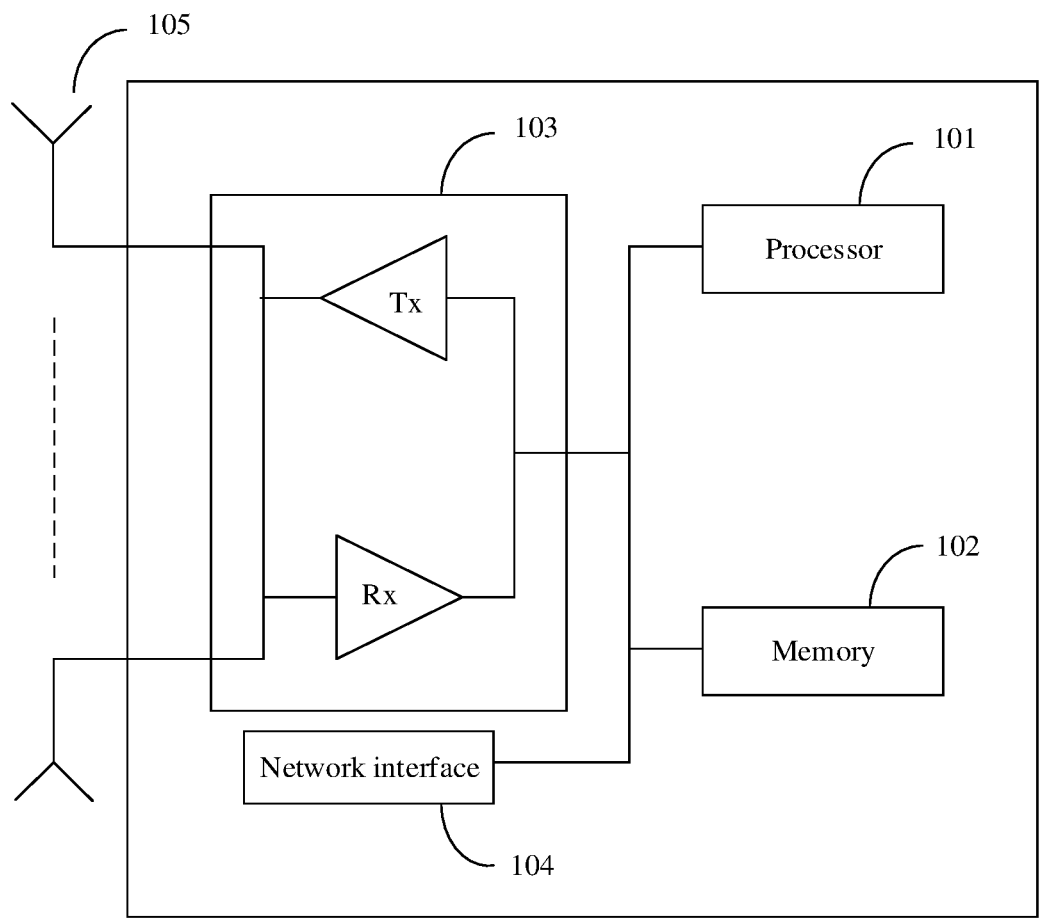
FIG. 2a is a schematic diagram of a structure of a base station according to an embodiment of this application.

FIG. 2a is a schematic diagram of a structure of a base station. In FIG. 2a:

The base station includes at least one processor 101, at least one memory 102, at least one transceiver 103, at least one network interface 104, and one or more antennas 105. The processor 101, the memory 102, the transceiver 103, and the network interface 104 are connected, for example, through a bus. The antenna 105 is connected to the transceiver 103. The network interface 104 is configured to enable the base station to be connected to another communication device through a communication link. In embodiments of this application, the connection may include various types of interfaces, transmission lines, buses, or the like. This is not limited in embodiments.

A processor, for example, the processor 101, in embodiments of this application may include at least one of the following types: a general-purpose central processing unit (CPU), a digital signal processor (DSP), a microprocessor, an application-specific integrated circuit (ASIC), a microcontroller unit (MCU), a field programmable gate array (FPGA), or an integrated circuit configured to implement a logical operation. For example, the processor 101 may be a single-core (single-CPU) processor or a multi-core (multi-CPU) processor. The at least one processor 101 may be integrated into one chip or located on a plurality of different chips.

A memory, for example, the memory 102, in embodiments of this application may include at least one of the following types: a read-only memory (ROM), another type of static storage device that can store static information and instructions, a random access memory (RAM), another type of dynamic storage device that can store information and instructions, or an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory is not limited thereto.

The memory 102 may exist independently, and is connected to the processor 101. Optionally, the memory 102 may alternatively be integrated with the processor 101, for example, integrated into one chip. The memory 102 can store program code for performing the technical solutions in embodiments of this application, and the processor 101 controls execution of the program code. Various types of computer program code to be executed may also be considered as drivers of the processor 101. For example, the processor 101 is configured to execute the computer program code stored in the memory 102, to implement the technical solutions in embodiments of this application. Optionally, the memory 102 may be located outside a chip, and is connected to the processor 101 through an interface.

The transceiver 103 may be configured to support receiving or sending of a radio frequency signal between an access network device and a terminal, and the transceiver 103 may be connected to the antenna 105. The transceiver 103 includes a transmitter Tx and a receiver Rx. Specifically, the one or more antennas 105 may receive a radio frequency signal. The receiver Rx of the transceiver 103 is configured to: receive the radio frequency signal from the antenna, convert the radio frequency signal into a digital baseband signal or a digital intermediate frequency signal, and provide the digital baseband signal or the digital intermediate frequency signal for the processor 101, so that the processor 101 further processes the digital baseband signal or the digital intermediate frequency signal, for example, performs demodulating processing and decoding processing. In addition, the transmitter Tx of the transceiver 103 is further configured to: receive a modulated digital baseband signal or digital intermediate frequency signal from the processor 101, convert the modulated digital baseband signal or digital intermediate frequency signal into a radio frequency signal, and send the radio frequency signal through the one or more antennas 105. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals.

Figure 2B:
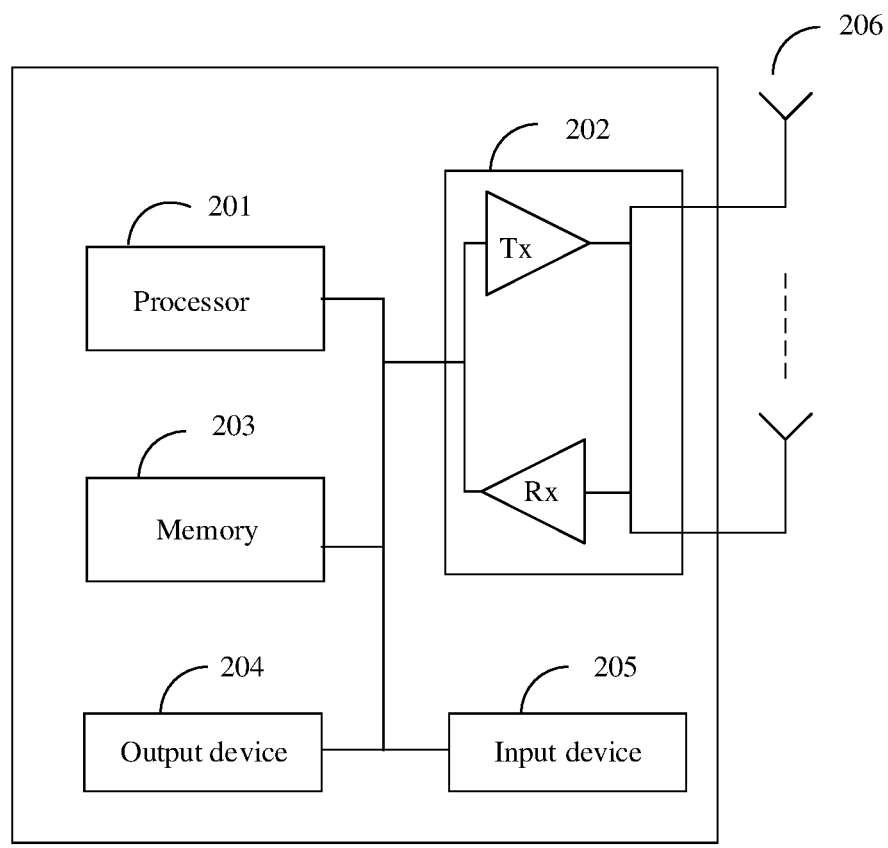
FIG. 2b is a schematic diagram of a structure of a terminal according to an embodiment of this application.

FIG. 2b is a schematic diagram of a structure of a terminal. In FIG. 2b:

The terminal includes at least one processor 201, at least one transceiver 202, and at least one memory 203. The processor 201, the memory 203, and the transceiver 202 are connected. Optionally, the terminal may further include an output device 204, an input device 205, and one or more antennas 206. The antenna 206 is connected to the transceiver 202, and the output device 204 and the input device 205 are connected to the processor 201.

For the transceiver 202, the memory 203, and the antenna 206, refer to related descriptions in FIG. 2a to implement similar functions.

The processor 201 may be a baseband processor or a CPU. The baseband processor and the CPU may be integrated or separated.

The processor 201 may be configured to implement various functions for the terminal, for example, configured to process a communications protocol and communications data, or configured to control an entire terminal device, execute a software program, and process data of the software program, or configured to assist in completing a computing processing task, for example, processing graphics and images or audio. Alternatively, the processor 201 is configured to implement one or more of the foregoing functions.

The output device 204 communicates with the processor 201, and may display information in a plurality of manners. For example, the output device 204 may be a liquid crystal display (LCD), a light emitting diode (LED) display device, a cathode ray tube (CRT) display device, or a projector. The input device 205 communicates with the processor 201, and may receive user input in a plurality of manners. For example, the input device 205 may be a mouse, a keyboard, a touchscreen device, or a sensing device.

The memory 203 may exist independently, and is connected to the processor 201. Optionally, the memory 203 may alternatively be integrated with the processor 201, for example, integrated into one chip. The memory 203 can store program code for performing the technical solutions in embodiments of this application, and the processor 201 controls execution of the program code. Various types of computer program code to be executed may also be considered as drivers of the processor 201. For example, the processor 201 is configured to execute the computer program code stored in the memory 203, to implement the technical solutions in embodiments of this application. Optionally, the memory 203 may be located outside a chip, and is connected to the processor 201 through an interface.

This application provides a communication method that can be applied to an MBMS service. The communication method in this application may be applied to a broadcast service scenario and/or a multicast service scenario. The multicast service scenario is further classified into a pre-defined multicast service and a non-predefined multicast service, and the non-predefined multicast service is a temporarily established multicast service (for a definition, refer to the background part). This application can effectively resolve a problem of service interruption of a predefined broadcast service, a predefined multicast service, and a temporarily established multicast service when a terminal moves between cells, to improve service continuity and reliability. With reference to the foregoing schematic diagram of the communication system shown in FIG. 1, the following describes specific implementation solutions of this application.

Based on the communication system shown in FIG. 1, group identity information in this application is first described. The group identity information may be used to uniquely identify an MBMS service.

In an example, if a service in which an MBMS service group is interested is a broadcast and/or multicast service having a predefined service feature, group identity information of this type of service is fixed group identity information in a cell, that is, each cell pre-configures corresponding group identity information for this type of service. In addition, group identity information configured for the service in the cells may be the same or may be different. For example, refer to FIG. 1. The base station 100, the base station 200, and the base station 300 all configure group identity information for a broadcast service A in cells included in the base stations. The group identity information may be the same or may be different. This is not limited in this application. The MBMS service group 1 to the MBMS service group 3 may receive service information and content of the broadcast service A based on the group identity information of the broadcast service A in the cells.

In another example, if a service in which an MBMS service group is interested is a broadcast and/or multicast service having a non-predefined service feature, the group identity information is used to uniquely identify one MBMS service in which one MBMS service group is interested. It may also be understood as that one group identity information corresponds to one MBMS service group. It should be noted that, for MBMS services of a same type, group identity information corresponding to MBMS services in which different MBMS service groups are interested is different. For example, an example in which a type of the MBMS services is vehicle platooning is used for description. Refer to FIG. 1. Both the MBMS service group 1 and the MBMS service group 2 access a cell 1 of a base station 100. The MBMS service group 1 is interested in a vehicle platooning service, group identity information configured by the cell 1 for the vehicle platooning service (referred to as a vehicle platooning service 1 below) in which the MBMS service group 1 is interested is group identity information A, and group identity information configured by the cell 1 for a vehicle platooning service (referred to as a vehicle platooning service 2 below) in which the MBMS service group 2 is interested is group identity information B. Correspondingly, a terminal in the MBMS service group 1 may receive content and information of the vehicle platooning service 1 in the cell 1 based on the group identity information A, and a terminal in the MBMS service group 2 may receive content and information of the vehicle platoon service 2 in the cell 1 based on the group identity information B. It can be learned that actually, even for MBMS services of a same type, group identity information configured by a cell for MBMS services in which different MBMS service groups are interested is different. It should be noted that accessing a cell by an MBMS service group in this application may be accessing a cell by one or more terminals in the MBMS service group.

Optionally, in this application, a terminal may belong to different MBMS service groups. In other words, a terminal may receive service content and information of an MBMS service corresponding to one or more MBMS service groups to which the terminal belongs. Optionally, an MBMS service group may be interested in one or more MBMS services. This is not limited in this application.

Optionally, in this application, group identity information of a broadcast service may be a temporary mobile group identity (TMGI), and group identity information of a multicast service may be a G-RNTI.

Still refer to FIG. 1. The following describes a technical solution in embodiments of this application.

Specifically, in this application, a terminal may receive service content and information of an MBMS service in which the terminal is interested in a currently accessed cell (referred to as a source cell below) based on group identity information of the MBMS service in the source cell. A base station (referred to as a source base station below) to which the source cell belongs may obtain group identity information of the MBMS service in a neighboring cell when a preset condition is triggered, and send the obtained group identity information to the terminal. After moving and/or accessing the neighboring cell, the terminal may continue to receive the service information and content of the MBMS service in the neighboring cell based on the pre-obtained group identity information of the MBMS service in the neighboring cell, thereby effectively reducing a multicast communication delay, improving service continuity and reliability, and improving user experience.

In this application, based on different application scenarios, the preset condition for triggering the source base station to negotiate (which is specifically a process of negotiation for a G-RNTI) with a target base station may specifically include:

Condition 1: When the terminal needs to be handed over, the source base station triggers an action of obtaining the group identity information of the MBMS service in the neighboring cell.

Condition 2: After configuring the group identity information for the MBMS service in which the terminal is interested, the source base station triggers an action of obtaining the group identity information of the MBMS service in the neighboring cell.

Condition 3: After the terminal accesses the source base station, and before the source base station configures the group identity information for the MBMS service in which the terminal is interested, an action of obtaining the group identity information of the MBMS service in the neighboring cell is triggered.

Optionally, in this application, for a broadcast and/or multicast service having a predefined feature, all base stations may pre-configure group identity information of an MBMS service, and mutually transmit a configuration result, that is, a mapping relationship between the MBMS service and the group identity information, so that each cell obtains group identity information configured by all neighboring cells for the MBMS service.

Optionally, in this application, if the neighboring cell includes a cell of the source base station, for this type of cell, the source base station may obtain, in the base station, the group identity information configured by the neighboring cell for the MBMS service. For example, the source base station may configure any piece of unoccupied group identity information in the neighboring cell for the MBMS service based on a current group identity information occupation status in the neighboring cell, and send the configured group identity information to the terminal. For a specific configuration process, refer to a conventional technology. This is not limited in this application.

Optionally, in this application, if the neighboring cell belongs to a cell of the target base station, for this type of cell, the source base station may obtain, in a manner of negotiating with the target base station, group identity information configured by the target base station for the MBMS service in the neighboring cell.

Specifically, in this application, a manner of negotiation between the source base station and the target base station may include:

Manner (1): The source base station sends first request information to the target base station, where the request information is used to indicate the target base station to send the group identity information of the MBMS service in the neighboring cell to the source base station.

Manner (2): The source base station sends second request information to the target base station, where the request information is used to indicate the target base station to configure the group identity information for the MBMS service and send the configured group identity information to the source base station.

Manner (3): The source base station sends third request information to the target base station, where the request information carries the group identity information of the MBMS service in the source cell, to recommend the group identity information to the neighboring cell, that is, the source base station expects that the neighboring cell also uses the group identity information as the group identity information of the MBMS service in the neighboring cell.

Optionally, the manner (1) may be directly used to request, from the target base station, the group identity information pre-configured by the target base station. That is, the target base station has obtained the MBMS service in advance, and configured the group identity information for the MBMS service. For example, for an MBMS service (for example, a broadcast service) having a predefined feature, the target base station may have configured corresponding group identity information for this type of service in the neighboring cell. Therefore, the source base station may directly request, from the target base station, the group identity information of the MBMS service in the neighboring cell. That is, for an application scenario of the MBMS service having the predefined feature, in a process of negotiation between the source base station and the target base station, the manner (1) may be used to obtain the group identity information of the MBMS service in the neighboring cell.

Optionally, the manner (2) may be understood as follows: The source base station sends the second request information to trigger the target base station to configure the group identity information for the MBMS service in the neighboring cell. Specifically, the source base station sends the second request information to the target base station. The target base station may configure any piece of group identity information in unoccupied group identity information in the neighboring cell for the MBMS service based on the request information, and the target base station sends, to the source base station, the group identity information configured for the MBMS service. Optionally, the group identity information configured by the target base station in the neighboring cell for the MBMS service may be the same as or different from the group identity information of the MBMS service in the source cell.

Optionally, the manner (3) may be understood as that the source base station sends the third request information to the target base station, to request the target base station to configure the group identity information (referred to as recommended group identity information below) of the MBMS service in the source cell as the group identity information of the MBMS service in the neighboring cell. Correspondingly, the target base station may determine, based on the group identity information occupation status in the neighboring cell, whether to accept the recommended group identity information that is configured for the MBMS service as the group identity information of the MBMS service in the neighboring group.

Optionally, based on a manner of interaction between a terminal and a source base station, this solution may be further described based on the following two scenarios:

Single-user scenario: Each terminal interacts with a source base station of the terminal to obtain group identity information, in a neighboring cell, of one or more MBMS services in which the terminal is interested.

Group communication scenario: An anchor terminal in an MBMS service group interacts with a source base station to obtain group identity information, in a neighboring cell, of one or more MBMS services in which the MBMS service group is interested.

Optionally, in this application, in the single-user scenario, after obtaining group identity information of the MBMS service in which the terminal is interested in one or more neighboring cells, the source base station sends the obtained group identity information to the terminal. For example, the group identity information may be sent to the terminal in a unicast manner.

Optionally, in this application, in the group communication scenario, the source base station may send obtained group identity information of the MBMS service in one or more neighboring cells to the anchor terminal, and then the anchor terminal delivers the corresponding group identity information to other terminals in the MBMS service group.

In this application, a manner of communication for the multicast service having the non-predefined feature is mainly described in detail. For a manner of negotiation for group identity information of a broadcast and/or multicast service having a predefined feature between base stations and/or a manner of sending the group identity information to the terminal by the source base station, refer to the solutions in this application. A manner of communication for the broadcast and/or multicast service having the predefined feature is not separately described in this application.

In this application, only a negotiation scenario in which the neighboring cell belongs to the target base station is described in detail. The following uses several specific embodiments to describe in detail the technical solution in the foregoing method embodiment.

Scenario 1

In this embodiment, the manner of interaction between a single user and a source base station is described by using a handover scenario as an example.

Figure 3:
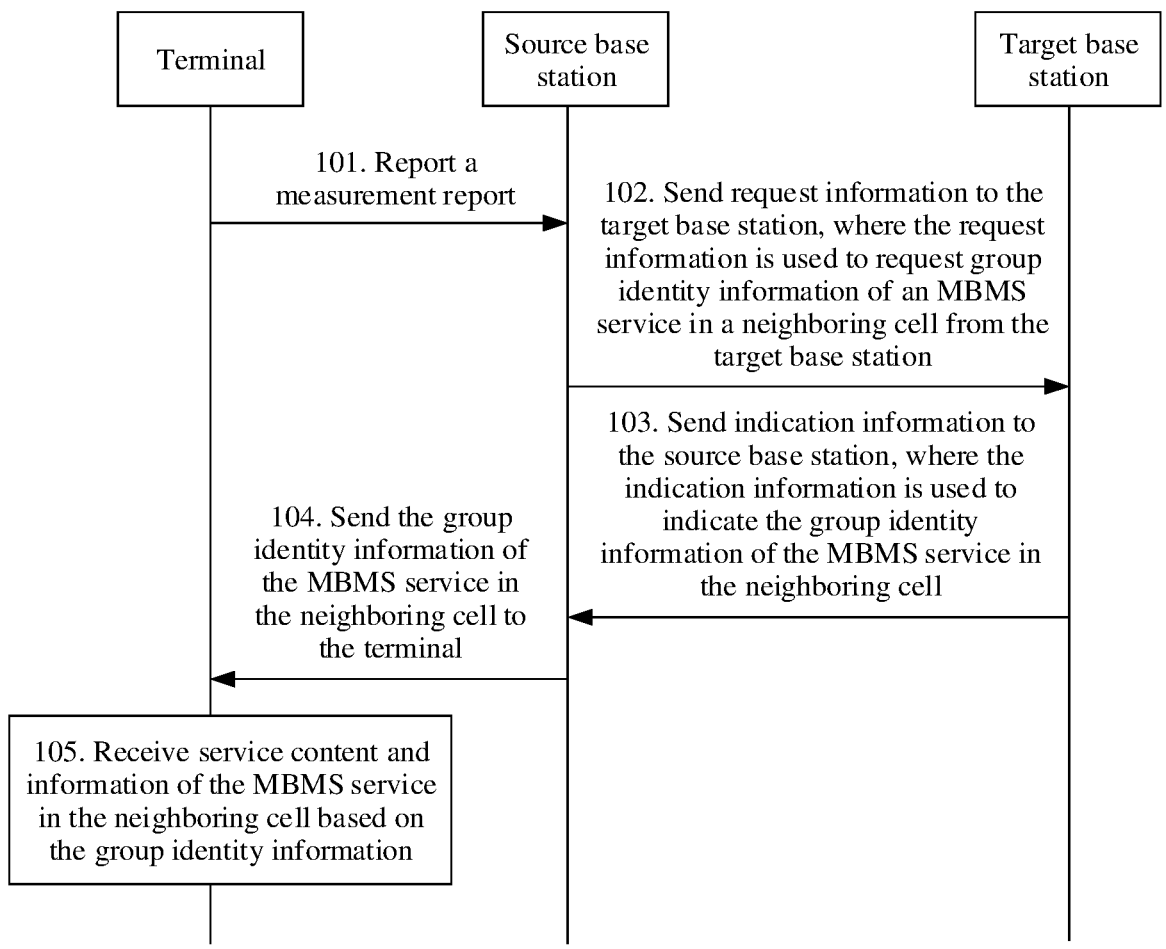
FIG. 3 is a schematic flowchart of an MBMS service communication method according to an embodiment of this application.

With reference to FIG. 1, FIG. 3 is a schematic flowchart of an MBMS service communication method according to an embodiment of this application. In FIG. 3:

Step 101. A terminal reports a measurement report to a source base station.

Specifically, in this application, the terminal may report the measurement report to the source base station periodically or in an event-triggered manner. The measurement report may include a measurement result of one or more cells. For details, refer to a conventional technology. This is not limited in this application.

Step 102. The source base station sends request information to a target base station, to request group identity information of an MBMS service in a neighboring cell from the target base station.

Specifically, in a handover application scenario, the source base station may determine, based on the measurement report reported by the terminal, whether the terminal needs to perform cell handover. If it is determined that the terminal needs to perform cell handover, a handover procedure may be performed; if it is determined that the terminal does not need to perform cell handover, the procedure ends. It should be noted that, for a handover-related procedure, refer to a technical solution in the conventional technology. Details are not described in this application.

Specifically, after determining that the terminal needs to be handed over, the source base station may negotiate with a base station to which the neighboring cell belongs (where this is referred to as a group identity information negotiation process below to be distinguished from a negotiation process in a handover process), to obtain the group identity information of the MBMS service in the neighboring cell.

Specifically, the source base station may send the request information to the target base station, to obtain the group identity information of the MBMS service in the neighboring cell. For a specific request manner, refer to the foregoing negotiation manners (1) to (3). Details are not described herein again. Optionally, the request information further includes MBMS service identity information, for example, an MBMS service ID, of the MBMS service in which the terminal is interested. In an example, the source base station may locally store a mapping relationship between a terminal and an MBMS service ID. That is, the source base station may determine, by retrieving local storage, the MBMS service ID corresponding to the MBMS service in which the terminal is interested, and send the MBMS service ID to the target base station. In another example, the terminal may report, to the source base station, the MBMS service ID corresponding to the MBMS service in which the terminal is interested, so that the source base station sends the MBMS service ID to the target base station.

It should be noted that the neighboring cell includes a target cell that may be used to serve the terminal. The target cell further includes a cell that is determined based on the measurement report reported by the terminal and that can be used for handover of the terminal. In this application, there are one or more neighboring cells, and there may also be one or more target cells. Optionally, the source base station may negotiate only with a target cell to which the terminal is to be handed over or that the terminal is to access, to reduce resource occupation between base stations. Optionally, the source base station may negotiate with one or more target cells (where a quantity of target cells is less than or equal to a quantity of neighboring cells), and send group identity information of the MBMS service in the one or more target cells to the terminal, to reduce a quantity of interactions between base stations and between a base station and the terminal, thereby reducing resource occupation. Optionally, the source base station may negotiate with one or more neighboring cells, and send group identity information of the MBMS service in the one or more neighboring cells to the terminal, to reduce occupation of air interface resources. Negotiation processes for different negotiation objects are described by using examples in the following embodiment.

Optionally, in the handover scenario, the request information (including first request information, second request information, or third request information) may be carried in a handover preparation message. In an example, the handover preparation message may be a handover required message. In another example, the handover preparation message may be a handover request message. This is not limited in this application.

Step 103. The target base station sends indication information to the source base station, where the indication information is used to indicate the group identity information of the MBMS service in the neighboring cell.

Specifically, in this application, the target base station receives the indication information, and may configure, based on an MBMS service ID carried in the indication information, corresponding group identity information for an MBMS service corresponding to the MBMS service ID, and send the MBMS service ID and the group identity information correspondingly to the source base station.

In a possible implementation, as described in the negotiation manner (1), for a broadcast/multicast service having a predefined feature, the target base station has pre-configured corresponding group identity information for this type of MBMS service. For a specific configuration process, refer to the conventional technology. Details are not described in this application. After receiving the first request information, the target base station may send the group identity information corresponding to the MBMS service to the source base station.

In another possible implementation, as described in the negotiation manner (2), for a broadcast/multicast service having a non-predefined feature, after receiving the second request information, the target base station may configure unoccupied group identity information for the MBMS service based on a current group identity information occupation status in the neighboring cell, and send the configured group identity information to the source base station.

In still another possible implementation, as described in the negotiation manner (3), for a broadcast/multicast service having a non-predefined feature, after receiving the third request information, the target base station determines whether group identity information (referred to as recommended group identity information below) of the MBMS service in a source cell can be used as the group identity information in the neighboring cell. A specific determining method may include: The target base station detects whether the recommended group identity information (which specifically refers to a value corresponding to the recommended group identity information) is occupied. Optionally, if the recommended group identity information is not occupied, the target base station may return first indication information to the source base station, where the indication information is used to indicate that the target base station accepts the recommended group identity information that is from the source base station, that is, the target base station supports configuration of the recommended group identity information for the MBMS service as the group identity information of the MBMS service in the neighboring cell. It may also be understood as that the indication information is used to indicate that the group identity information of the MBMS service in the neighboring cell is the same as the group identity information of the MBMS service in the source cell. Optionally, if the recommended group identity information from the source base station is occupied in the neighboring cell, the target base station may configure group identity information (referred to as new group identity information below) for the MBMS service, and send the new group identity information to the source base station.

Optionally, in the handover scenario, after receiving the handover preparation message, the target base station may determine, based on a cell status, whether to admit the terminal to the neighboring cell and serve the terminal. That is, the target cell may send service information and content corresponding to the MBMS service in which the terminal is interested, and perform scrambling by using group identity information in the target cell. Optionally, if the target base station determines to allow the terminal to access the neighboring cell and serve the terminal, the target base station prepares a handover-required resource for the terminal, and includes success information in a handover preparation response message, where the success information is used to indicate that the target base station allows the terminal to access the neighboring cell and prepares the handover-required resource for the terminal. Otherwise, the handover preparation response message may carry failure information. Optionally, the handover preparation response message may be a handover request acknowledgment response (Handover Request Acknowledge) message.

Optionally, the group identity information of the MBMS service in the neighboring cell or the first indication information may be carried in the handover preparation response message. Optionally, the first indication information may further include the MBMS service ID and is used to indicate a mapping relationship between the MBMS service ID and the group identity information. Optionally, the handover preparation response message includes cell information, for example, cell identity information, of the neighboring cell, so that the source base station can learn of a mapping relationship between cell identity information, an MBMS service ID, and group identity information. That is, after receiving the handover preparation response message, the source base station can identify a specific neighboring cell by which and a specific MBMS service to which group identity information is allocated.

Step 104. The source base station sends the group identity information of the MBMS service in the neighboring cell to the terminal.

Specifically, after obtaining the group identity information of the MBMS service in the neighboring cell, the source base station may indicate the group identity information to the terminal that is interested in the MBMS service. In an example, after receiving the handover preparation response message, the source base station may not parse the indication information carried in the handover preparation response message, but forwards the cell identity information and the indication information in the handover preparation response message to the terminal. In other words, the source base station may transparently transmit the indication information to the terminal, to indicate the terminal to parse the indication information. In another example, after receiving the handover preparation response message, the source base station may parse the indication information carried in the handover preparation response message, that is, obtain group identity information of the MBMS service indicated by each neighboring cell, and send the group identity information of the MBMS service in which the terminal is interested in the neighboring cell to the terminal. For example, the source base station sends the cell identity information, the MBMS service ID, and the group identity information to the terminal, to indicate a mapping relationship between a neighboring cell, an MBMS service, and group identity information to the terminal.

Optionally, in this application, there may be two manners in which the source base station sends the group identity information to the terminal. Manner 1: The source base station directly indicates, to the terminal, group identity information configured for the MBMS service by a cell (referred to as a handover cell below) that the terminal is to access or to which the terminal is to be handed over. Manner 2: The source base station indicates, to the terminal, group identity information configured by a plurality of neighboring cells for the MBMS service.

Optionally, the two manners each may be described based on two scenarios. One scenario is that the group identity information of the MBMS service in the neighboring cell is the same as that in the source cell, and the other scenario is that the group identity information of the MBMS service in the neighboring cell is different from that in the source cell. The following separately describes indication manners in different scenarios of the foregoing two manners.

Manner 1: The source base station sends the group identity information of the MBMS service in the handover cell to the terminal.

(1) The group identity information of the MBMS service in the handover cell is the same as that in the source cell.

Optionally, in this scenario, the source base station may select, for the terminal, a handover cell that the terminal needs to access or to which the terminal is to be handed over, and send a handover command message to the terminal. The message includes but is not limited to related configurations of the handover cell, for example, cell identity information of the handover cell. Optionally, in this application, the first indication information may be included in the handover command message. In other words, the source base station transparently transmits the first indication information to the terminal by using the handover command message. The terminal may determine, by parsing the first indication information in the handover command message, that the group identity information of the MBMS service in the handover cell is the same as currently used group identity information. Optionally, the source base station may alternatively parse the first indication information by itself, and learn that the group identity information of the MBMS service in the handover cell is the same as that in the source cell. Optionally, the handover command message may include the group identity information of the MBMS service in the handover cell (that is, the group identity information in the source cell).

(2) The group identity information of the MBMS service in the handover cell is different from that in the source cell.

Optionally, in this scenario, the source base station may select the handover cell for handover of the terminal, and send a handover command message to the terminal, where the message includes but is not limited to cell identity information of the handover cell and the group identity information of the MBMS service in the handover cell. In this way, the terminal may obtain the group identity information of the MBMS service in the handover cell while obtaining related configurations of the handover cell.

Manner 2: The source base station sends the group identity information of the MBMS service in the plurality of neighboring cells to the terminal.

(1) The group identity information of the MBMS service in the plurality of neighboring cells is the same as that in the source cell.

Optionally, the source base station may send cell identity information of the plurality of neighboring cells and the first indication information to the terminal. In an example, the source base station may send a cell list and the first indication information to the terminal, to indicate that group identity information configured by a cell corresponding to cell identity information in the cell list for the MBMS service is the same as that in the source cell. In another example, the source base station may send a plurality of handover command messages to the terminal, where each handover command message carries cell identity information of one neighboring cell and the first indication information.

Optionally, the source base station may further send, to the terminal, area identity (Valid area ID) information of valid areas to which the plurality of neighboring cells belong and the first indication information. It should be noted that all cells of the MBMS service in the valid area have same group identity information. That is, the source base station sends a valid ID to the terminal, to indicate that group identity information configured by each cell in the valid area corresponding to the valid ID for the MBMS service is the same as that in the source cell. It should be noted that, if the source base station notifies the terminal of group identity information of the MBMS service in at least one valid area by indicating area identity information of the valid area to the terminal, in a negotiation process (which refers to the group identity information negotiation process) between the source base station and the target base station, each cell in each valid area performs negotiation internally, to determine that cells in the valid area configure same group identity information for the MBMS service, and then notifies the source base station of a negotiation result in the valid area and a list of cells included in the valid area. Optionally, a base station to which any cell in the valid area belongs may notify the source base station of an area list in the valid area, and the source base station negotiates for group identity information with each cell in the valid area. A specific negotiation process is similar to that in the foregoing embodiment, and details are not described herein again.

(2) The group identity information of the MBMS service in the plurality of neighboring cells is different from that in the source cell. Optionally, the source base station may send a cell list to the terminal, where the cell list includes cell identity information of the plurality of neighboring cells and group identity information configured by the neighboring cells for the MBMS service, to indicate a correspondence between the neighboring cells and the group identity information. Optionally, the source base station may further indicate the group identity information of the MBMS service to the terminal in a manner of sending for a plurality of times, that is, indicating each time cell identity information of one neighboring cell and group identity information configured by the neighboring cell for the MBMS service to the terminal. Optionally, the source base station may send the foregoing information to the terminal by using a handover command message.

Optionally, the source base station may send the handover command message to the terminal, where the message includes but is not limited to a valid area ID of one or more valid areas to which the plurality of neighboring cells belong and corresponding group identity information. Specific details are the same as those in the scenario (2) in the manner 1, and are not described herein again.

Optionally, in this application, if the source base station indicates, to the terminal, the group identity information configured by the plurality of neighboring cells for the MBMS service, the group identity information of the MBMS service in the plurality of neighboring cells may be maintained by the terminal. That is, in a subsequent movement process of the terminal, the terminal may send, to a newly accessed base station, a cell list or a valid area ID maintained by the terminal. If the newly accessed base station detects a target cell with which the newly accessed base station needs to negotiate for group identity information or the handover cell to which the terminal is to be handed over is in the cell list or in a valid area corresponding to the valid area ID, the source base station may continue to perform a handover procedure, with no need to perform a group identity information negotiation process. In the handover procedure, the terminal obtains cell information (for example, cell identity information) of the handover cell from the source base station; determines, based on the cell identity information, that the group identity information of the MBMS service in the cell has been obtained; and after the terminal is handed over to the handover cell, continues to receive the content and information of the MBMS service based on the group identity information. Optionally, if the newly accessed base station detects the target cell with which the newly accessed base station needs to negotiate for group identity information, or detects that the handover cell to which the terminal is to be handed over is not in the cell list or is not in the valid area corresponding to the valid area ID, a group identity information negotiation procedure is re-performed.

Optionally, in this application, the negotiated group identity information of the MBMS service in the plurality of neighboring cells may be alternatively maintained by the base station. Specifically, after obtaining the group identity information configured by the plurality of cells for the MBMS service, the source base station may send a cell list or a valid area ID maintained by the source base station to a neighboring cell or a target cell, or a base station to which the handover cell belongs sends a cell list or a valid area ID maintained by the base station to a neighboring cell or a target cell. In a subsequent movement process of the terminal, the base station newly accessed by the terminal may determine, through retrieval, whether the target cell with which the newly accessed base station needs to negotiate for group identity information or the handover cell to which the terminal is to be handed over is in the cell list or a valid area corresponding to the valid area ID. If a retrieval result is yes, the newly accessed base station continues to perform the handover process, with no need to perform the group identity information negotiation process. If the retrieval result is no, the newly accessed base station re-performs the group identity information negotiation process.

Step 105. The terminal receives the service information and content of the MBMS service in the neighboring cell based on the group identity information.

Optionally, after receiving the group identity information of the MBMS service in the handover cell and accessing the handover cell, the terminal may continue to receive the service content and information of the MBMS service in the handover cell based on the group identity information of the MBMS service in the handover cell.

Optionally, when the terminal receives the group identity information of the MBMS service in the plurality of neighboring cells, the terminal may switch to an idle state. Specifically, when the terminal moves to a neighboring cell, the terminal may read, by using cell broadcast information, cell identity information of the neighboring cell or area identity information of a valid area to which the neighboring cell belongs, and obtain, by retrieving local storage, group identity information corresponding to the cell identity information (or the area identity information), to continue to receive, in the neighboring cell, the service content and information of the MBMS service based on the group identity information. Optionally, when the terminal moves to a neighboring cell, if the terminal does not locally retrieve group identity information of the MBMS service in the neighboring cell, the terminal enters a connected state, and repeats the foregoing group identity information negotiation process and the foregoing process of obtaining the group identity information. Compared with the conventional technology, this application can reduce, when the terminal obtains the group identity information of the MBMS service in the plurality of neighboring cells, a quantity of interactions between the terminal and a base station, to reduce occupation of air interface resources.

Figure 4:
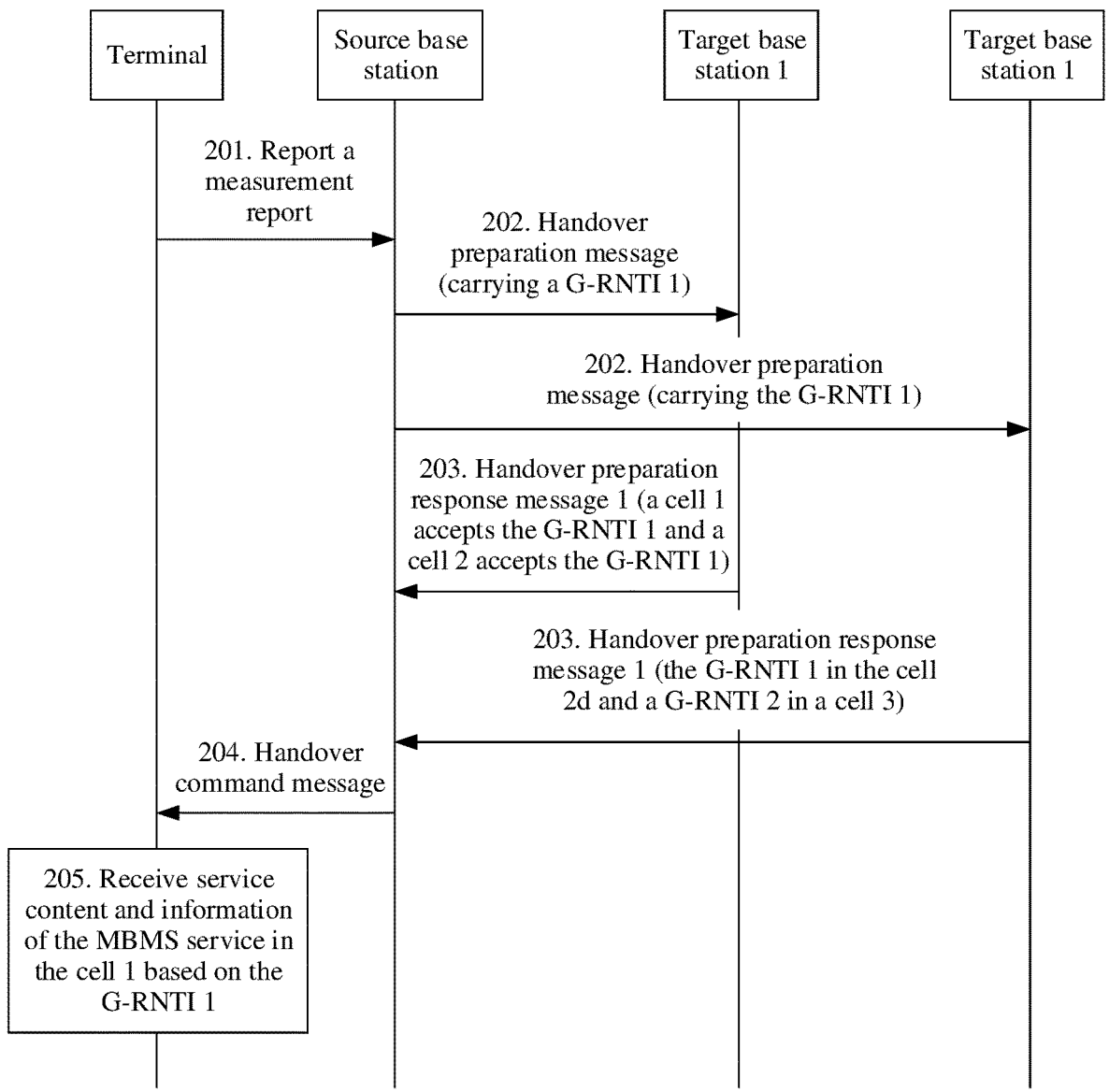
FIG. 4 is a schematic flowchart of an MBMS service communication method according to an embodiment of this application.

Based on the embodiment shown in FIG. 3, FIG. 4 is a schematic flowchart of an example of an MBMS service communication method. In FIG. 4:

Step 201. A terminal reports a measurement report to a source base station.

For example, the terminal reports the measurement report to the source base station, where the measurement report includes measurement results of a cell 1 and a cell 2 of a target base station 1 and measurement results of a cell 3, a cell 4, and a cell 5 of a target base station 2.

Step 202. The source base station sends a handover preparation message to a target base station, where the message carries a G-RNTI 1 of an MBMS service in a source cell.

For example, the source base station determines, based on the measurement report reported by the terminal, that the cell 1 to the cell 4 may be used as target cells that serve the terminal.

Correspondingly, the source base station separately sends the handover preparation message to the target base station 1 and the target base station 2, where the handover preparation message includes but is not limited to an MBMS service ID, a G-RNTI, and a cell identity information. For example, in this embodiment, the source base station requests, from the target base station 1, the cell 1 and the cell 2 of the target base station 1 to configure a G-RNTI 1 for the MBMS service, and the source base station requests, from the target base station 2, the cell 3 and the cell 4 of the target base station 2 to configure a G-RNTI 1 for the MBMS service.

Step 203. The target base station sends a handover preparation response message to the source base station.

For example, the target base station 1 determines, based on a G-RNTI occupation status of the cell 1, that the cell 1 can accept the G-RNTI 1. The target base station 1 determines, based on a G-RNTI occupation status of the cell 2, that the cell 2 can accept the G-RNTI 1. The target base station 2 determines, based on a G-RNTI occupation status of the cell 3, that the cell 3 does not accept the G-RNTI 1, and configures a G-RNTI 2 for the MBMS service. The target base station 2 determines, based on a G-RNTI occupation status of the cell 4, that the cell 4 does not accept the G-RNTI 1, and configures a G-RNTI 3 for the MBMS service.

For example, it is determined that the terminal may be allowed to access the foregoing four target cells. Specific details are not further described.

The target base station 1 sends a handover preparation response message 1 to the source base station, where the handover preparation response message 1 includes but is not limited to an MBMS service ID, cell identity information 1 of the cell 1, and first indication information, to indicate that a G-RNTI configured by the cell 1 for the MBMS service corresponding to the MBMS service ID is the same as that in the source cell, that is, the G-RNTI 1.

The target base station 1 sends a handover preparation response message 2 to the source base station, where the handover preparation response message 2 includes but is not limited to an MBMS service ID, cell identity information 2 of the cell 2, and first indication information, to indicate that a G-RNTI configured by the cell 2 for the MBMS service corresponding to the MBMS service ID is the same as that in the source cell, that is, the G-RNTI 1.

The target base station 2 sends a handover preparation response message 3 to the source base station, where the handover preparation response message 3 includes but is not limited to an MBMS service ID, cell identity information 3 of the cell 3, and a G-RNTI (the G-RNTI 2) of the MBMS service in the cell 3, to indicate that the G-RNTI configured by the cell 3 for the MBMS service corresponding to the MBMS service ID is the G-RNTI 2.

The target base station 2 sends a handover preparation response message 4 to the source base station, where the handover preparation response message 4 includes cell identity information 4 of the cell 4 and a G-RNTI (the G-RNTI 3) of the MBMS service in the cell 4.

It should be noted that this embodiment is described only by using an example in which different G-RNTIs are configured by the cell 3 and the cell 4 for the MBMS service. Optionally, the G-RNTIs configured by the cell 3 and the cell 4 for the MBMS service may be the same. This is not limited in this application.

Step 204. The source base station sends a handover command message to the terminal.

For example, the source base station sends the handover command message to the terminal, where the handover command message includes a G-RNTI list, and the G-RNTI list includes but is not limited to the MBMS service ID, cell identity information, and the first indication information or a corresponding G-RNTI.

For example, in this embodiment, the G-RNTI list includes {cell identity information 1, MBMS service ID, first indication information}, {cell identity information 2, MBMS service ID, first indication information}, {cell identity information 3, MBMS service ID, G-RNTI 2}, and {cell identity information 4, MBMS service ID, G-RNTI 3}.

For example, the handover command message may carry related configurations of the cell 1, to indicate that the terminal can be handed over to the cell 1.

Step 205. The terminal receives service content and information of the MBMS service in the cell 1 based on the G-RNTI 1.

Figure 5:
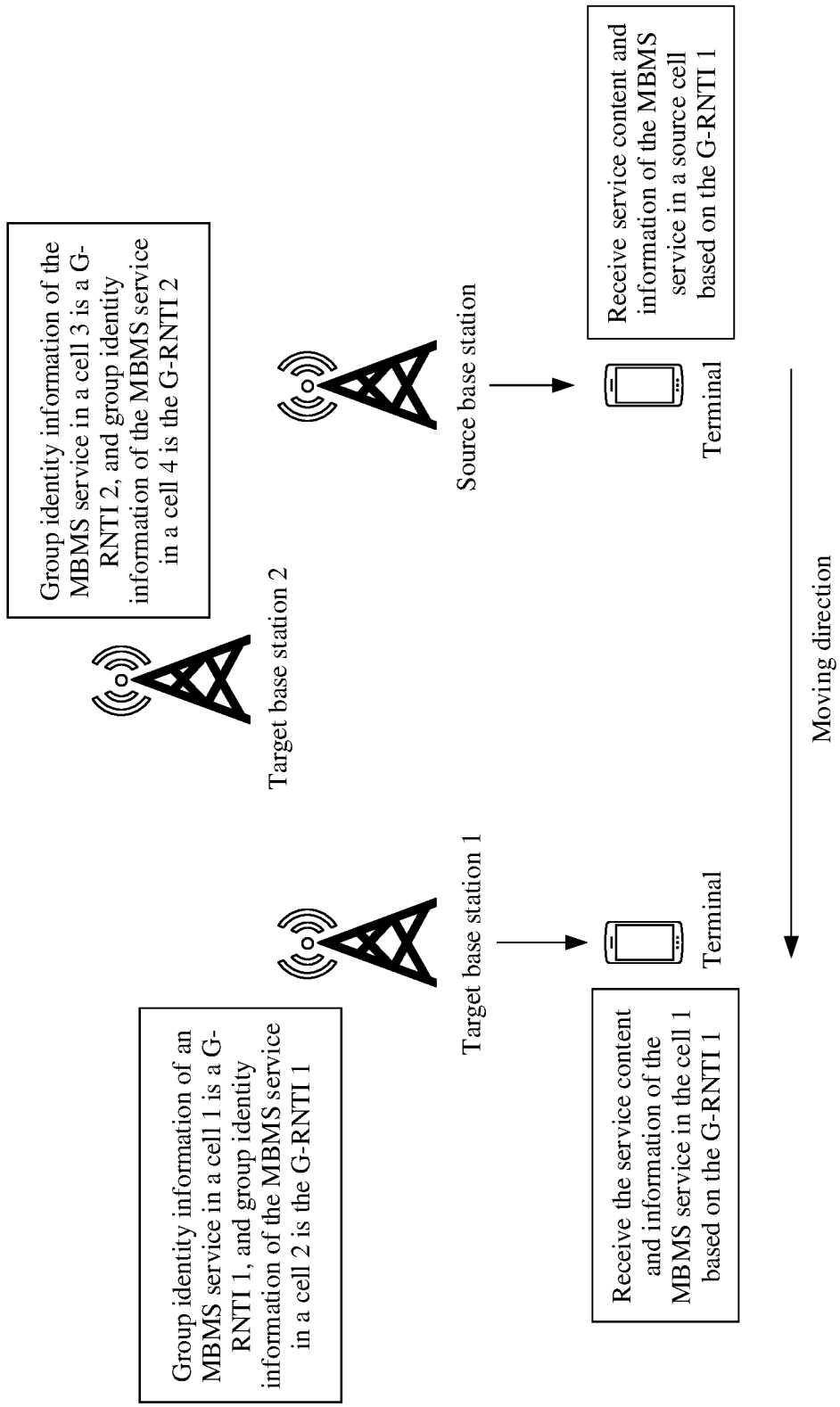
FIG. 5 is a schematic diagram showing MBMS service communication in a terminal handover scenario according to an embodiment of this application.

For example, the terminal is handed over to the cell 1 (where for a specific handover process, refer to a conventional technology, and details are not described herein), and the terminal may continue to receive the service content and information of the MBMS service in the cell 1 based on the G-RNTI 1. FIG. 5 is a diagram of an MBMS service communication process in a handover process of a single terminal according to this embodiment. It should be noted that, in this embodiment, the single terminal may be any terminal in an MBMS service group. For a manner of obtaining a G-RNTI by each terminal, refer to the foregoing descriptions. Details are not described again in this application.

Optionally, in a subsequent movement process of the terminal, that the terminal is handed over from the cell 1 to the cell 3 is used as an example. The terminal may send a measurement report and cell identity information of a cell whose G-RNTI has been obtained to a base station (that is, the target base station 2) to which a currently accessed cell belongs, where the cell identity information includes the cell identity information 2, the cell identity information 3, and the cell identity information 4. The target base station 2 determines that the terminal needs to be handed over to the cell 3, and detects that the terminal has obtained the G-RNTI configured by the cell 3 for the MBMS service. The target base station 2 may directly perform a handover procedure. After being handed over to the cell 3, the terminal may continue to receive the service information and content of the MBMS service in the cell 3 based on the G-RNTI 2. Optionally, if the target base station 2 detects, based on the measurement report reported by the terminal, that a cell (referred to as a new target cell below) does not exist in a cell reported by the terminal, the target base station 2 may negotiate with a base station to which the cell (that does not exist in the cell reported by the terminal) belongs, and sends an obtained G-RNTI of the MBMS service in the new target cell to the terminal, to update the G-RNTI stored on the terminal side.

Scenario 2

The following uses a handover scenario as an example to describe the group communication scenario in detail.

Figure 6:
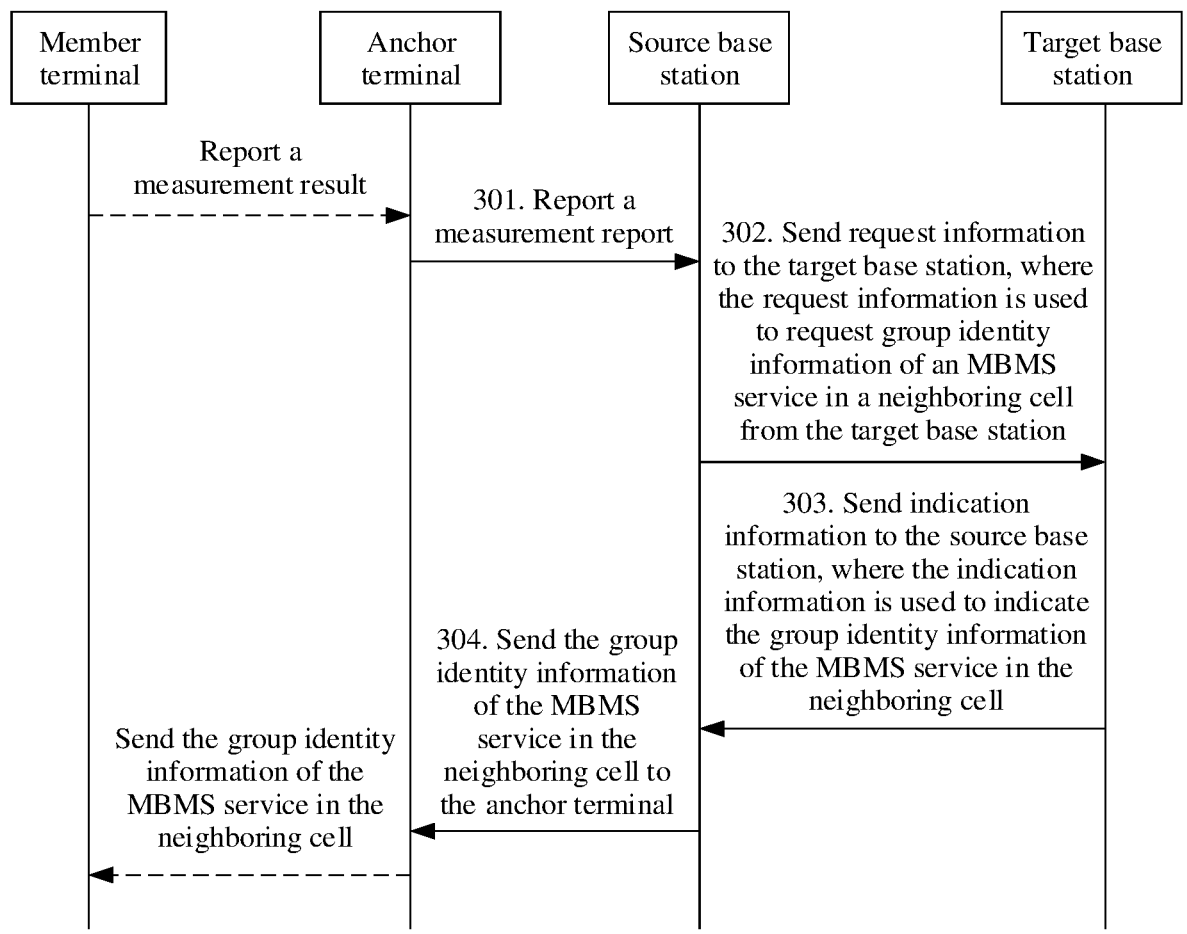
FIG. 6 is a schematic flowchart of an MBMS service communication method according to an embodiment of this application.

With reference to FIG. 1, FIG. 6 is a schematic flowchart of an MBMS service communication method according to an embodiment of this application. In FIG. 6:

Step 301. An anchor terminal reports a measurement report to a source base station.

Specifically, the anchor terminal reports the measurement report to the source base station accessed by the anchor terminal. For example, if a member terminal (which may be in a connected state or an idle state) in an MBMS service group to which the anchor terminal belongs always keeps a specific distance from the anchor terminal, that is, each member terminal and the anchor terminal always access or camp on a same cell, in this scenario, the anchor terminal may report only a measurement result of the anchor terminal. For example, if members include a member terminal that accesses or camps on a different cell from the anchor terminal, the measurement report reported by the anchor terminal includes but is not limited to a measurement result of this type of member terminal.

Step 302. The source base station sends request information to a target base station, to request group identity information of an MBMS service in a neighboring cell from the target base station.

Specifically, in a handover application scenario, the source base station may determine, based on the measurement report reported by the anchor terminal, whether terminals in the MBMS service group need to perform cell handover. Optionally, after determining that the terminals need to perform cell handover, the source base station determines, for each terminal in the MBMS service group, a target cell that can serve the terminal, and negotiates with the target cell for group identity information of the MBMS service in the target cell. Optionally, refer to the foregoing descriptions. The source base station may alternatively negotiate with all neighboring cells. This is not limited in this application.

Optionally, in this application, the terminals in the MBMS service group may be in different states, and for MBMS service group in different states, negotiation objects of the source base station may be different. Specifically, in this application, the terminals in the MBMS service group may be in the following types of states:

State 1: The anchor terminal accesses a source cell, and the member terminals each are in an idle state and within coverage of the source cell. It may be understood that the anchor terminal and the member terminals in the MBMS service group may receive information and content of the MBMS service in a same cell based on a same G-RNTI, and it is considered that the terminals in the MBMS service group are always within coverage of the same cell.

State 2: The anchor terminal accesses a source cell, and the member terminals each are in an idle state and not within coverage of a same cell as the anchor terminal.

State 3: The anchor terminal accesses a source cell, and the member terminals also access the source cell.

State 4: The anchor terminal accesses a source cell, and the member terminals access other cells. The other cells may belong to a base station to which the source cell belongs, or may belong to other base stations.

Optionally, for the state 1 and the state 2, the source base station may obtain a connection status of each member terminal via the anchor terminal. Optionally, the anchor terminal may report a measurement result of a member terminal in a connected state. For an MBMS service group in which there is a member terminal in an idle state, especially for an MBMS service group corresponding to the state 2, the source base station may request group identity information of the MBMS service from all neighboring cells, to ensure that a member terminal in an idle state can also pre-obtain group identity information configured for the MBMS service by a cell in which the member terminal is located.

Optionally, for an MBMS service group corresponding to the state 3, a procedure of negotiation between the source base station and the target base station is similar to that in the scenario 1, and details are not described herein again.

Optionally, for an MBMS service group corresponding to the state 4, the source base station accessed by the anchor terminal performs a group identity information negotiation procedure. A handover procedure of each terminal in the MBMS service group is similar to that in a conventional technology, and the source base station may negotiate for group identity information for at least one terminal in the MBMS service group. It should be noted that a procedure of negotiation between the source base station and the target base station is similar to that in the scenario 1, and details are not described herein again.

Step 303. The target base station sends indication information to the source base station, where the indication information is used to indicate the group identity information of the MBMS service in the neighboring cell.

This step is similar to that in the scenario 1, and details are not described herein again.

Step 304. The source base station sends the group identity information of the MBMS service in the neighboring cell to the anchor terminal.

Specifically, after obtaining group identity information of the MBMS service in one or more neighboring cells, the source base station may send the group identity information of the MBMS service in the one or more neighboring cells to the anchor terminal.

In an example, as described above, if a member terminal in an idle state exists in the MBMS service group, for the MBMS service, it is considered by default that group identity information of the MBMS service in all neighboring cells may need to be obtained, and the obtained group identity information of the MBMS service in all the neighboring cells is sent to the anchor terminal. The anchor terminal forwards the group identity information of the MBMS service in all the neighboring cells to the member terminal.

In another example, as described above, if the source base station obtains group identity information configured for the MBMS service by a target cell corresponding to each member terminal, the source base station may send the obtained group identity information to the anchor terminal, and the anchor terminal forwards the obtained group identity information to the corresponding member terminal.

Optionally, the source base station sends a handover command message to the anchor terminal, where the handover command message may include but is not limited to a group identity information list, and the list includes identity information of each terminal in the MBMS service group, cell identity information of a target cell corresponding to the terminal, and group identity information of the MBMS service in the target cell. It should be noted that target cells corresponding to all terminals may be the same or different. This is not limited in this application. Optionally, the anchor terminal may forward the group identity information list to each member terminal. Optionally, alternatively, the anchor terminal may distribute, based on the identity information of each terminal, the cell identity information of the target cell corresponding to each terminal and the group identity information to the corresponding terminal. Optionally, the source base station may send a plurality of group identity information lists to the anchor terminal, where each group identity information list corresponds to a terminal in one MBMS service group. The anchor terminal may forward the list to a corresponding member terminal.

Figure 7:
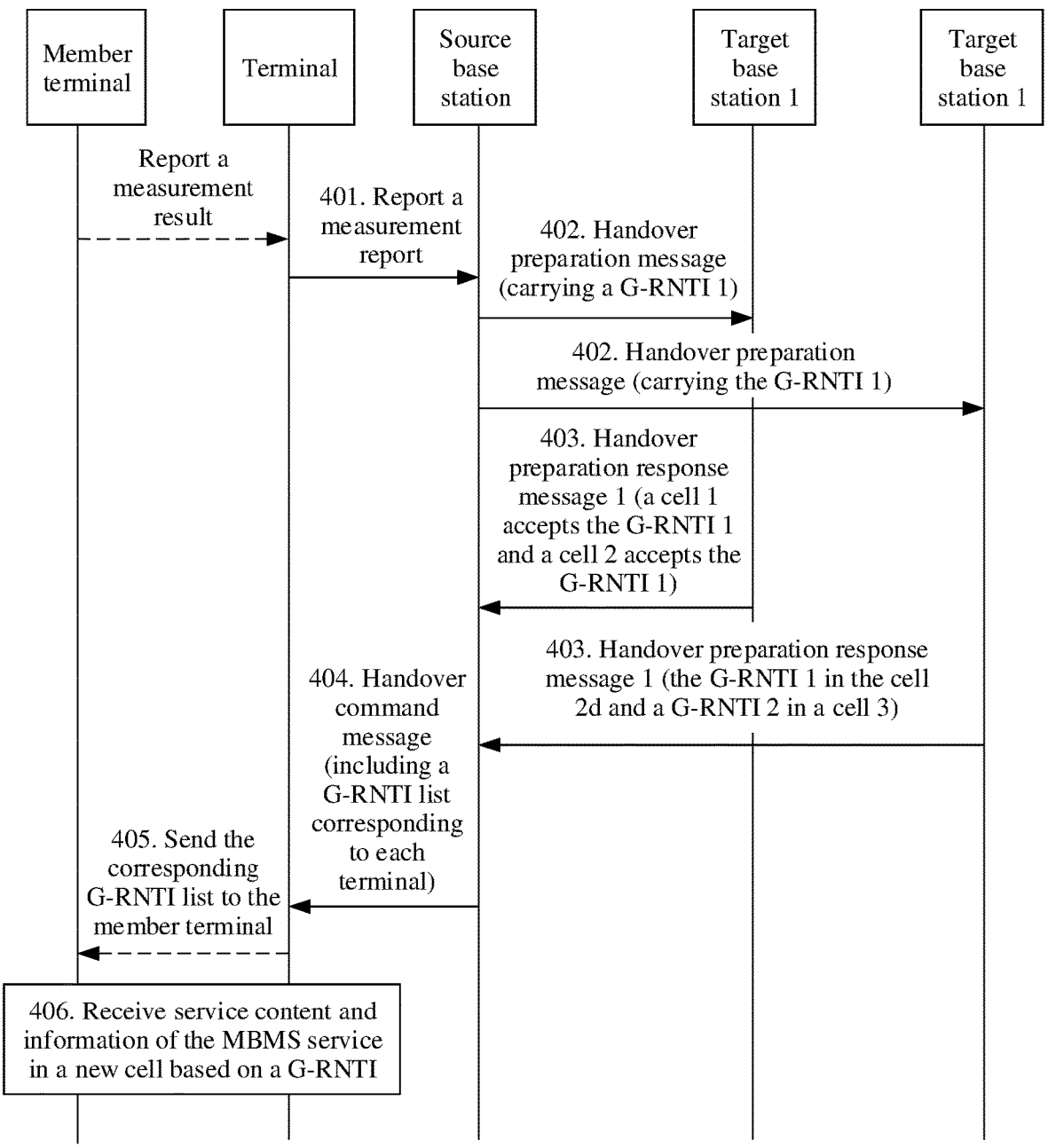
FIG. 7 is a schematic flowchart of an MBMS service communication method according to an embodiment of this application.

Based on the embodiment shown in FIG. 6, FIG. 7 is a schematic flowchart of an example of an MBMS service communication method. In FIG. 7:

Step 401. An anchor terminal reports a measurement report to a source base station.

For example, states of terminals in an MBMS service group are as follows: The anchor terminal accesses a source cell, a terminal 1 is in a connected state and accesses the source cell, a terminal 2 is in a connected state and accesses a cell 1 of a target base station 1, and a terminal 3 is in an idle state and within coverage of the source cell. In this embodiment, the source cell belongs to the source base station, the cell 1 and a cell 2 belong to the target base station 1, and a cell 3 and a cell 4 belong to a target base station 2.

Figure 8:
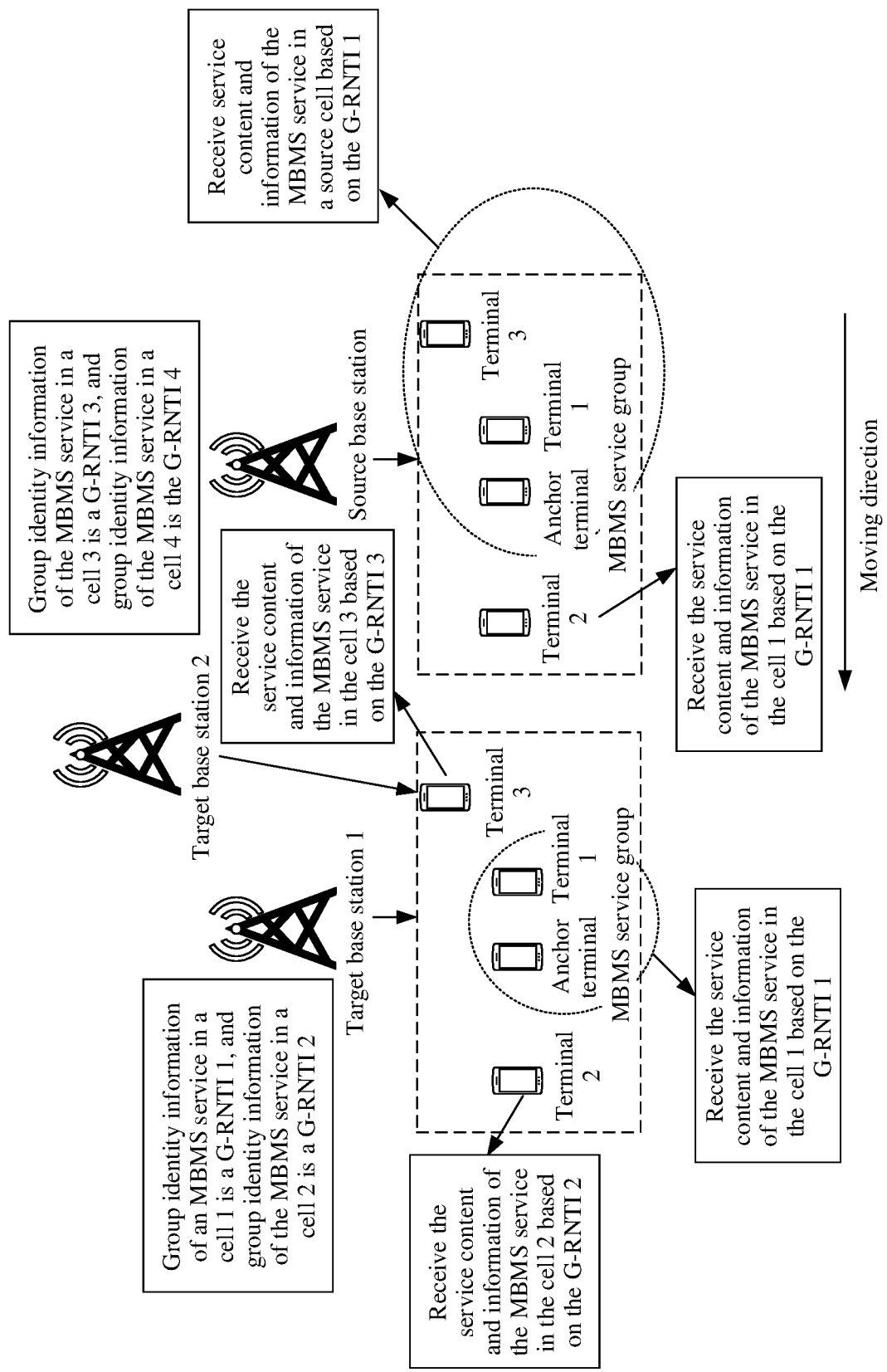
FIG. 8 is a schematic diagram showing MBMS service communication in a group communication scenario according to an embodiment of this application.

For example, FIG. 8 is a schematic diagram of MBMS service communication in a group communication scenario in this embodiment. Refer to FIG. 8. The anchor terminal receives, in the source cell, service content and information of an MBMS service based on a G-RNTI 1; the terminal 1 receives, in the source cell, the service content and information of the MBMS service based on the G-RNTI 1; the terminal 2 receives, in the cell 1, the service content and information of the MBMS service based on the G-RNTI 1; and the terminal 3 receives, in the source cell, the service content and information of the MBMS service based on the G-RNTI 1.

The anchor terminal reports a measurement report, where the measurement report includes measurement results of the terminal 1 and the terminal 2, and a current connection state of each terminal.

Step 402. The source base station sends a handover preparation message to a target base station, where the message carries the G-RNTI 1 of the MBMS service in the source cell.

For example, the source base station determines, based on the measurement report reported by the anchor terminal, that target cells of the anchor terminal are the cells 1 to 4, target cells of the terminal 1 are the cells 1 to 4, and target cells of the terminal 2 are the cells 2 to 4. For the terminal 3 in an idle state, the source base station may consider that it is necessary to send, to the terminal 3, G-RNTIs configured by all neighboring cells (including the cell 1 to the cell 4) for the MBMS service.

Optionally, the source base station may send the handover preparation message to the target base station, to obtain a G-RNTI of the MBMS service in a target cell. Specific details are similar to those in the scenario 1, and details are not described herein again.

Optionally, the source base station sends a measurement report of the terminal 2 to the target base station 1, to trigger the target base station 1 to perform a cell handover procedure for the terminal 2.

Step 403. The target base station sends a handover preparation response message to the source base station.

For example, each target base station 1 determines, based on a G-RNTI occupation status of a neighboring cell, whether to accept the G-RNTI 1 recommended by the source cell (which is specifically the source base station).

For example, in this embodiment, the target base station 1 determines, based on a G-RNTI occupation status of the cell 2, that the cell 2 does not accept the G-RNTI 1, and configures a G-RNTI 2 for the MBMS service. The target base station 2 determines, based on a G-RNTI occupation status of the cell 3, that the cell 3 does not accept the G-RNTI 1, and configures a G-RNTI 3 for the MBMS service. The target base station 2 determines, based on a G-RNTI occupation status of the cell 4, that the cell 4 does not accept the G-RNTI 1, and configures a G-RNTI 4 for the MBMS service. It should be noted that, for the cell 1, the cell 1 has configured a G-RNTI (that is, the G-RNTI 1) for the MBMS service. Therefore, the cell 1 only needs to return indication information to the source base station, to indicate that the G-RNTI configured by the cell 1 for the MBMS service is the same as that in the source cell.

For example, it is determined that the terminal may be allowed to access the foregoing four target cells. Specific details are not further described.

The target base station 1 sends a handover preparation response message 1 to the source base station, where the handover preparation response message 1 includes but is not limited to cell identity information 1 of the cell 1 and first indication information, to indicate that the G-RNTI configured by the cell 1 for the MBMS service is the same as that in the source cell, that is, the G-RNTI 1.

The target base station 1 sends a handover preparation response message 2 to the source base station, where the handover preparation response message 2 includes but is not limited to cell identity information 2 of the cell 2 and a G-RNTI (the G-RNTI 2) of the MBMS service in the cell 2, to indicate that the G-RNTI configured by the cell 2 for the MBMS service is the same as that in the source cell, that is, the G-RNTI 1.

The target base station 2 sends a handover preparation response message 3 to the source base station, where the handover preparation response message 3 includes cell identity information 3 of the cell 3 and a G-RNTI (the G-RNTI 3) of the MBMS service in the cell 3.

The target base station 2 sends a handover preparation response message 4 to the source base station, where the handover preparation response message 4 includes cell identity information 4 of the cell 4 and a G-RNTI (the G-RNTI 4) of the MBMS service in the cell 4.

Step 404. The source base station sends a handover command message to a terminal.

For example, the source base station sends the handover command message to the terminal. The handover command message includes a G-RNTI list 1 of the anchor terminal, a G-RNTI list 2 of the terminal 1, a G-RNTI list 3 of the terminal 2, and a G-RNTI list 3 of the terminal 3. Optionally, identity information of a terminal may be used as index information for each G-RNTI list. To be specific, the anchor terminal may determine, by identifying the identity information of the terminal carried in each G-RNTI list, an object to which the G-RNTI list is to be sent.

For example, the G-RNTI list 1 of the anchor terminal includes {cell identity information 1, MBMS service ID, first indication information}, {cell identity information 2, MBMS service ID, G-RNTI 2}, {cell identity information 3, MBMS service ID, G-RNTI 3}, and {cell identity information 4, MBMS service ID, G-RNTI 4}.

The G-RNTI list 2 of the terminal 1 includes {cell identity information 1, MBMS service ID, first indication information}, {cell identity information 2, MBMS service ID, G-RNTI 2}, {cell identity information 3, MBMS service ID, G-RNTI 3}, and {cell identity information 4, MBMS service ID, G-RNTI 4}.

The G-RNTI list 3 of the terminal 2 includes {cell identity information 2, MBMS service ID, G-RNTI 2}, {cell identity information 3, MBMS service ID, G-RNTI 3}, and {cell identity information 4, MBMS service ID, G-RNTI 4}.

The G-RNTI list 4 of the terminal 3 includes {cell identity information 1, MBMS service ID, first indication information}, {cell identity information 2, MBMS service ID, G-RNTI 2}, {cell identity information 3, MBMS service ID, G-RNTI 3}, and {cell identity information 4, MBMS service ID, G-RNTI 4}.

For example, in this embodiment, a handover cell of the anchor terminal is the cell 1, a handover cell of the terminal 1 is the cell 1, a handover cell of the terminal 2 is the cell 2, and the terminal 3 moves within coverage of the cell 3. For a specific handover procedure, refer to a conventional technology. Details are not described herein.

Step 405. The anchor terminal sends a corresponding G-RNTI list to a member terminal.

For example, the anchor terminal sends a plurality of received G-RNTI lists to corresponding member terminals.

Step 406. The terminal in the MBMS service group receives service content and information of the MBMS service in a new cell based on a G-RNTI.

For example, refer to FIG. 8. The anchor terminal is handed over to the cell 1 (where in this embodiment, a cell to which the terminal is handed over or moves is referred to as a new cell), and the anchor terminal may continue to receive, in the cell 1, the service content and information of the MBMS service based on the G-RNTI 1. The terminal 1 is handed over to the cell 1, and the terminal 1 may continue to receive the service content and information of the MBMS service in the cell 1 based on the G-RNTI 1. The terminal 2 is handed over to the cell 2, and the terminal 2 may continue to receive the service content and information of the MBMS service in the cell 2 based on the G-RNTI 2. The terminal 3 moves to the cell 3, obtains the cell identity information 3 of the cell 3 by reading broadcast information of the cell 3, retrieves a locally stored G-RNTI list based on the cell identity information 3, and extracts a G-RNTI (that is, the G-RNTI 3) of the MBMS service in the cell 3. The terminal 3 may continue to receive the service content and information of the MBMS service in the cell 3 based on the G-RNTI 3.

A subsequent movement process is similar to that in the scenario 1. When reporting the measurement report, the anchor terminal may simultaneously report the plurality of G-RNTI lists obtained in step 404.

Scenario 3

In this embodiment, the condition 2 and the condition 3 are used as examples for description.

Figure 9:
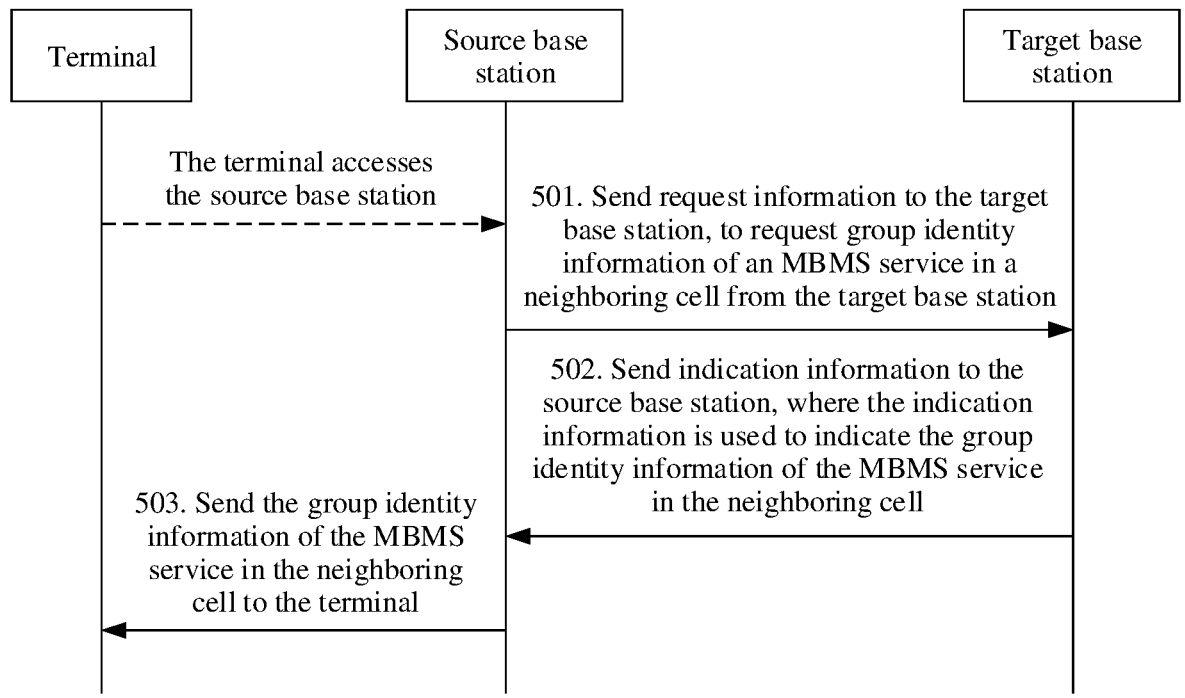
FIG. 9 is a schematic flowchart of an MBMS service communication method according to an embodiment of this application.

With reference to FIG. 1, FIG. 9 is a schematic flowchart of an MBMS service communication method according to an embodiment of this application. In FIG. 9:

Step 501. A source base station sends request information to a target base station, to request group identity information of an MBMS service in a neighboring cell from the target base station.

Specifically, as described in the foregoing condition 2 and condition 3, the source base station may trigger a negotiation process with the target base station after a terminal accesses a source cell, that is, after detecting a new MBMS service. Alternatively, the source base station may trigger a negotiation process with the target base station after configuring the group identity information for the MBMS service.

A specific negotiation process is similar to that in the scenario 1 and the scenario 2, and details are not described herein again.

Step 502. The target base station sends indication information to the source base station, where the indication information is used to indicate the group identity information of the MBMS service in the neighboring cell.

Step 503. The source base station sends the group identity information of the MBMS service in the neighboring cell to the terminal.

Optionally, in this application, the source base station may send the group identity information of the MBMS service in the neighboring cell to the terminal in a broadcast manner. Specifically, the source base station may periodically send broadcast information. For example, a system information block (SIB) in the broadcast information includes the group identity information of the MBMS service in the neighboring cell. A terminal in an MBMS service group may obtain the group identity information of the MBMS service in the neighboring cell by reading the broadcast information. In this way, after moving to the neighboring cell, the terminal can continue to receive service information and content of the MBMS service in the neighboring cell based on the pre-obtained group identity information of the MBMS service in the neighboring cell. For example, the broadcast information includes an MBMS service ID, cell identity information, and the group identity information that are used to identify group identity information of the MBMS service in a cell. Alternatively, the broadcast information may include area identity information, an MBMS service ID, and group identity information that are used to indicate group identity information of the MBMS service in a valid area.

Optionally, in this application, the source base station may send the group identity information of the MBMS service in the neighboring cell to the terminal based on the manner in the scenario 1 or the scenario 2. In other words, the embodiment in the scenario 3 may also be applied to the single-user scenario and the group communication scenario. For details, refer to the scenario 1 and the scenario 2. Details are not described herein again.

The foregoing mainly describes the solutions provided in embodiments of this application from a perspective of interaction between the network elements. It may be understood that, to implement the foregoing functions, the base station and the terminal include corresponding hardware structures and/or software modules for performing the functions. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, division into function modules of the base station and the terminal may be performed based on the foregoing method examples. For example, each function module may be obtained through division based on a corresponding function, or two or more functions may be integrated into one processing module. The integrated module may be implemented in a form of hardware, or may be implemented in a form of a software functional module. It should be noted that, in this embodiment of this application, division into the modules is an example, and is merely a logical function division. In actual implementation, another division manner may be used.

Figure 10:
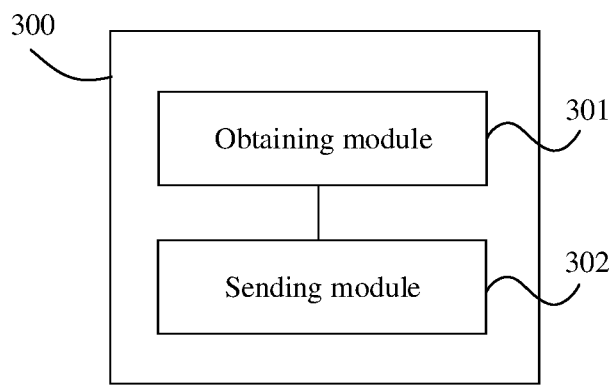
FIG. 10 is a schematic diagram of a structure of a base station according to an embodiment of this application.

FIG. 10 is a possible schematic diagram of a structure of a base station 300 in the foregoing embodiments. Refer to FIG. 10. The base station 300 includes an obtaining module 301 and a sending module 302. The obtaining module 301 is configured to obtain first group identity information of an MBMS service of a terminal device in a neighboring cell. The sending module 302 is configured to send the first group identity information to the terminal device.

Based on the foregoing technical solution, if the neighboring cell belongs to a target base station, the obtaining module 301 is specifically configured to: request group identity information of the MBMS service in the neighboring cell from the target base station; and obtain the first group identity information, indicated by the target base station, of the MBMS service in the neighboring cell.

Based on the foregoing technical solution, the obtaining module 301 is specifically configured to: send request information to the target base station, where the request information includes second group identity information and is used to indicate that the second group identity information is group identity information of the MBMS service in a source cell, and the source cell belongs to a source base station; and receive first indication information sent by the target base station, where the first indication information is used to indicate that the first group identity information is the same as the second group identity information.

Based on the foregoing technical solution, the obtaining module 301 is specifically configured to: send request information to the target base station, where the request information includes second group identity information and is used to indicate that the second group identity information is group identity information of the MBMS service in a source cell, and the source cell belongs to a source base station; and receive second indication information sent by the target base station, where the second indication information includes the first group identity information, and the first group identity information is different from the second group identity information.

Based on the foregoing technical solution, the request information is sent by the source base station to the target base station after the source base station configures the second group identity information for the MBMS service; the request information is sent after the terminal device accesses the source base station and before the source base station configures the second group identity information for the MBMS service; or the request information is sent by the source base station to the target base station after the source base station determines, based on a measurement report reported by the terminal device, that the terminal device needs to perform cell handover.

Based on the foregoing technical solution, the neighboring cell includes a target cell, the target cell is a cell that is determined based on the measurement report reported by the terminal device and that may be used to serve the terminal device, and the measurement report includes a measurement result of each terminal device in an MBMS service group to which the terminal device belongs.

Based on the foregoing technical solution, the sending module 302 is specifically configured to send third indication information to the terminal device, where the third indication information is used to indicate that first group identity information of the MBMS service group in the neighboring cell is the same as second group identity information of the MBMS service group in the source cell.

Based on the foregoing technical solution, the sending module 302 is specifically configured to send fourth indication information to the terminal device, where the fourth indication information includes cell identity information of the neighboring cell and the corresponding first group identity information.

Based on the foregoing technical solution, the first group identity information includes a group radio network temporary identifier G-RNTI, or the first group identity information is a temporary mobile group identity TMGI.

Figure 11:
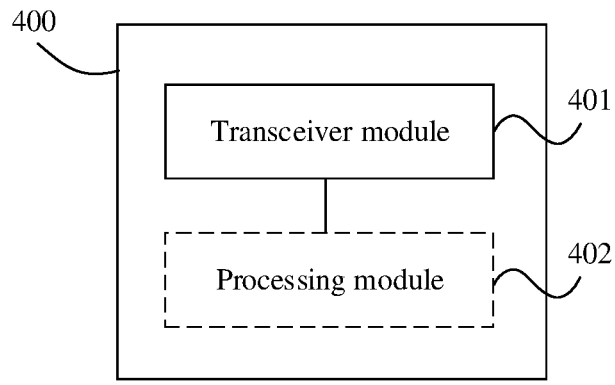
FIG. 11 is a schematic diagram of a structure of a base station according to an embodiment of this application.

FIG. 11 is a possible schematic diagram of a structure of a base station 400 in the foregoing embodiments. Refer to FIG. 11. The base station 400 includes a transceiver module 401, configured to receive request information sent by a source base station, where the request information is used to request, from a target base station, group identity information of an MBMS service in a neighboring cell of the target base station. The transceiver module 401 is further configured to indicate first group identity information of the MBMS service in the neighboring cell to the source base station based on the request information.

Based on the foregoing technical solution, the transceiver module 401 is specifically configured to send first indication information to the source base station if the base station detects that the first group identity information configured for the MBMS exists, where the first indication information includes the first group identity information.

Based on the foregoing technical solution, the base station 400 further includes a processing module 402, configured to: if the target base station does not detect group identity information configured for the MBMS, configure the first group identity information for the MBMS. The transceiver module 401 is further configured to send second indication information to the source base station, where the second indication information includes the first group identity information.

Based on the foregoing technical solution, the request information includes second group identity information and is used to indicate that the second group identity information is group identity information of the MBMS service in a source cell, and the processing module 402 is configured to determine, based on the request information, whether to accept that the group identity information of the MBMS service in the neighboring cell is the same as the second group identity information. If the processing module 402 determines to accept that the group identity information is the same as the second group identity information, the transceiver module 401 is configured to send third indication information to the source base station, where the third indication information is used to indicate that the first group identity information is the same as the second group identity information.

Based on the foregoing technical solution, the request information includes second group identity information and is used to indicate that the second group identity information is group identity information of the MBMS service in a source cell, and the processing module 402 is configured to determine, based on the request information, whether to accept that the group identity information of the MBMS service in the neighboring cell is the same as the second group identity information. If the processing module 402 determines not to accept that the group identity information is the same as the second group identity information, the processing module configures the first group identity information for the MBMS service, where the first group identity information is different from the second group identity information; and the transceiver module 401 is configured to send fourth indication information to the source base station, where the fourth indication information includes the first group identity information.

Based on the foregoing technical solution, the first group identity information includes a group radio network temporary identifier G-RNTI, or the first group identity information is a temporary mobile group identity TMGI.

Figure 12:
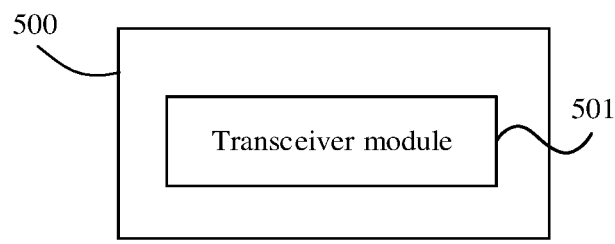
FIG. 12 is a schematic diagram of a structure of a terminal according to an embodiment of this application.

FIG. 12 is a possible schematic diagram of a structure of a terminal 500 in the foregoing embodiments. Refer to FIG. 12, the terminal 500 includes a transceiver module 501, configured to receive, in a source cell, service information of an MBMS service based on first group identity information. The transceiver module 501 is further configured to obtain second group identity information indicated by a source base station to which the source cell belongs, where the second group identity information is group identity information of the MBMS service in a neighboring cell. The transceiver module 501 is further configured to receive, in the neighboring cell, the service information of the MBMS service based on the second group identity information.

Based on the foregoing technical solution, the transceiver module 501 is further configured to: receive first indication information sent by the source base station, where the first indication information is used to indicate that the group identity information of the MBMS service in the neighboring cell is the same as the first group identity information of the MBMS service in the source cell; and receive, in the neighboring cell, the service information of the MBMS service based on the second group identity information that is the same as the first group identity information.

Based on the foregoing technical solution, the transceiver module 501 is further configured to: receive second indication information sent by the source base station, where the second indication information includes the second group identity information of the MBMS service in the neighboring cell; and receive, in the neighboring cell, the service information of the MBMS service based on the second group identity information.

Based on the foregoing technical solution, the transceiver module 501 is further configured to: receive a second group identity information list sent by the source base station, where the second group identity information list includes cell identity information of at least one neighboring cell and group identity information of the MBMS service in the neighboring cell; and after the terminal device accesses or moves to a target cell, match cell identity information of the target cell with the cell identity information of the at least one neighboring cell in the second group identity information list; and if the matching succeeds, obtain second group identity information corresponding to successfully matched cell identity information, and receive, in the target cell, the service information of the MBMS service based on the second group identity information.

Based on the foregoing technical solution, the transceiver module 501 is further configured to: receive a second group identity information list sent by the source base station, where the second group identity information list includes a second group identity information sublist of at least one member terminal in an MBMS service group to which the terminal device belongs; and send the second group identity information sublist to the corresponding member terminal. The second group identity information sublist includes identity information of at least one neighboring cell and group identity information of the MBMS service in the neighboring cell.

Figure 13:
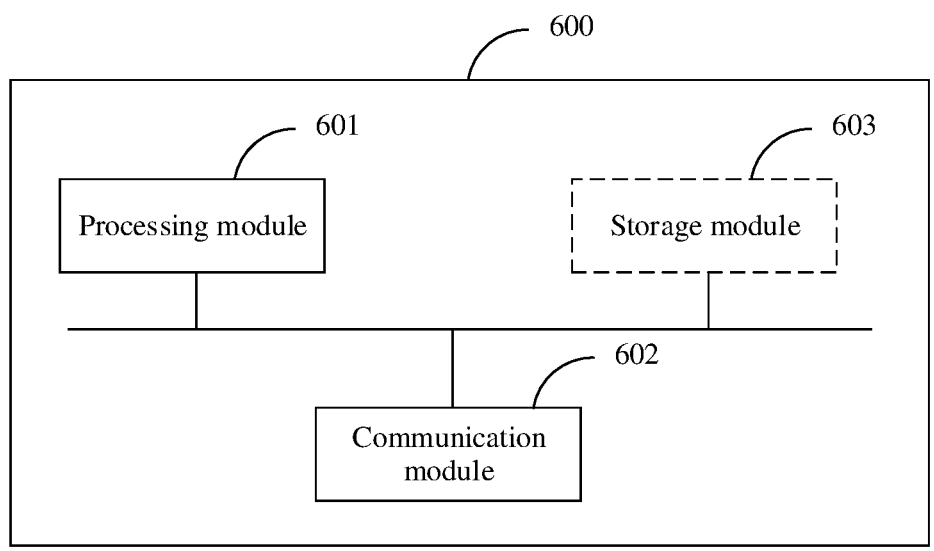
FIG. 13 is a schematic diagram of a structure of an apparatus according to an embodiment of this application.

The following describes an apparatus provided in an embodiment of this application. As shown in FIG. 13:

The apparatus includes a processing module 601 and a communication module 602. Optionally, the apparatus further includes a storage module 603. The processing module 601, the communication module 602, and the storage module 603 are connected through a communication bus.

The communication module 602 may be an apparatus having a transceiver function, and is configured to communicate with another network device or a communication network.

The storage module 603 may include one or more memories. The memory may be a component configured to store a program or data in one or more devices or circuits.

The storage module 603 may exist independently, and is connected to the processing module 601 through the communication bus. The storage module may alternatively be integrated with the processing module 601.

The apparatus 600 may be used in a network device, a circuit, a hardware component, or a chip.

The apparatus 600 may be the terminal in embodiments of this application, and a schematic diagram of the terminal may be FIG. 2b. Optionally, the communication module 602 of the apparatus 600 may include an antenna and a transceiver of the terminal, for example, the antenna 206 and the transceiver 202 in FIG. 2b. Optionally, the communication module 602 may further include an output device and an input device, for example, the output device 204 and the input device 205 in FIG. 2b.

The apparatus 600 may be a chip in the terminal in embodiments of this application. The communication module 602 may be an input/output interface, a pin, a circuit, or the like. Optionally, the storage module may store computer-executable instructions in a method on a terminal side, so that the processing module 601 performs the method on the terminal side in the foregoing embodiments. The storage module 603 may be a register, a cache, a RAM, or the like. The storage module 603 may be integrated with the processing module 601. The storage module 603 may be a ROM or another type of static storage device that can store static information and instructions. The storage module 603 may be independent of the processing module 601. Optionally, with development of wireless communication technologies, a transceiver may be integrated into the apparatus 600. For example, the transceiver 202 is integrated into the communication module 602.

When the apparatus 600 is the terminal or a chip in the terminal in embodiments of this application, the apparatus 600 may implement the method performed by the terminal in the foregoing embodiments. Details are not described herein again.

The apparatus 600 may be the base station in embodiments of this application. A schematic diagram of the base station may be FIG. 2a. Optionally, the communication module 602 of the apparatus 600 may include an antenna and a transceiver of the base station, for example, the antenna 105 and the transceiver 103 in FIG. 2a. The communication module 602 may further include a network interface of the base station, for example, the network interface 104 in FIG. 2a.

The apparatus 600 may be a chip in the base station in embodiments of this application. The communication module 602 may be an input/output interface, a pin, a circuit, or the like. Optionally, the storage module may store computer-executable instructions in a method on a base station side, so that the processing module 601 performs the method on the base station side in the foregoing embodiments. The storage module 603 may be a register, a cache, a RAM, or the like. The storage module 603 may be integrated with the processing module 601. The storage module 603 may be a ROM or another type of static storage device that can store static information and instructions. The storage module 603 may be independent of the processing module 601. Optionally, with development of wireless communication technologies, a transceiver may be integrated into the apparatus 600. For example, the transceiver 103 and the network interface 104 are integrated into the communication module 602.

When the apparatus 600 is the base station or a chip in the base station in embodiments of this application, the apparatus may implement the method performed by the base station in the foregoing embodiments. Details are not described herein again.

An embodiment of this application further provides a computer-readable storage medium. The methods described in the foregoing embodiments may be all or partially implemented by using software, hardware, firmware, or any combination thereof. If the methods are implemented in the software, functions used as one or more instructions or code may be stored in the computer-readable medium or transmitted on the computer-readable medium. The computer-readable medium may include a computer storage medium and a communication medium, and may further include any medium that can transfer a computer program from one place to another. The storage medium may be any available medium accessible to a computer.

In an optional design, the computer-readable medium may include a RAM, a ROM, an EEPROM, a CD-ROM or another optical disc storage device, a magnetic disk storage device or another magnetic storage device, or any other medium that can be configured to carry or store required program code in a form of instructions or a data structure and that may be accessed by the computer. In addition, any connection is appropriately referred to as a computer-readable medium. For example, if a coaxial cable, an optical fiber cable, a twisted pair, a digital subscriber line (DSL), or wireless technologies (such as infrared, radio, and microwave) are used to transmit software from a website, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a compact disk (CD), a laser disk, an optical disc, a digital versatile disc (DVD), a floppy disk, and a Blu-ray disc. The magnetic disks usually magnetically reproduce data, and the optical discs optically reproduce data by using laser light. The foregoing combinations should also be included within the scope of the computer-readable medium.

An embodiment of this application further provides a computer program product. The methods described in the foregoing embodiments may be all or partially implemented by using software, hardware, firmware, or any combination thereof. When the methods are implemented in the software, the methods may be all or partially implemented in a form of the computer program product. The computer program product includes one or more computer instructions. When the foregoing computer program instructions are loaded and executed on a computer, the procedures or functions described in the foregoing method embodiments are all or partially generated. The computer may be a general-purpose computer, a dedicated computer, a computer network, a network device, user equipment, or another programmable apparatus.

The foregoing describes embodiments of this application with reference to the accompanying drawings. However, this application is not limited to the foregoing specific implementations. The foregoing specific implementations are merely examples, and are not limitative. Inspired by this application, a person of ordinary skill in the art may further make many modifications without departing from the purposes of this application and the protection scope of the claims, and all the modifications shall fall within the protection scope of this application.

What is claimed is:

1. A communication method comprising:
  requesting, by a source base station of a terminal device, first group identity information of a multimedia broadcast multicast service (MBMS) in a neighboring cell, wherein when the neighboring cell belongs to a target base station, requesting the first group identity information of the MBMS in the neighboring cell comprises:
    requesting, by the source base station, group identity information of the MBMS in the neighboring cell from the target base station, wherein requesting the group identity information of the MBMS in the neighboring cell from the target base station comprises:
      sending, by the source base station, request information to the target base station, wherein the request information comprises second group identity information and indicates that the second group identity information is group identity information of the MBMS in a source cell, and the source cell belongs to the source base station; and
  obtaining, by the source base station in response to requesting the group identity information of the MBMS, the first group identity information indicated by the target base station, wherein obtaining the first group identity information indicated by the target base station comprises:
    receiving, by the source base station, first indication information sent by the target base station, wherein the first indication information indicates that the first group identity information is same as the second group identity information; and
  sending, by the source base station, the first group identity information to the terminal device, the first group identity information enabling the terminal device to receive the MBMS in the neighboring cell.

2. The method according to claim 1, wherein sending the first group identity information to the terminal device comprises:
  sending, by the source base station, third indication information to the terminal device, wherein the third indication information indicates that the first group identity information of the MBMS in the neighboring cell is same as the second group identity information of the MBMS in the source cell.

3. The method according to claim 1, wherein the neighboring cell comprises a target cell, the target cell is determined based on a measurement report reported by the terminal device and is usable to serve the terminal device, and the measurement report comprises a measurement result of each terminal device in an MBMS service group to which the terminal device belongs.

4. A base station comprising:
  a non-transitory memory and a processor, wherein the memory is coupled to the processor; and
  the memory stores program instructions; and when the program instructions are executed by the processor, the base station is caused to perform the following:
  obtaining first group identity information of a multimedia broadcast multicast service (MBMS) service in a neighboring cell, wherein when the neighboring cell belongs to a target base station, obtaining the first group identity information of the MBMS in the neighboring cell comprises:
    requesting group identity information of the MBMS in the neighboring cell from the target base station, wherein requesting the group identity information of the MBMS in the neighboring cell from the target base station comprises:
      sending request information to the target base station, wherein the request information comprises second group identity information and indicates that the second group identity information is group identity information of the MBMS in a source cell, and the source cell belongs to a source base station; and
  obtaining, in response to requesting the group identity information of the MBMS, the first group identity information indicated by the target base station, wherein obtaining the first group identity information indicated by the target base station comprises:
    receiving first indication information sent by the target base station, wherein the first indication information indicates that the first group identity information is same as the second group identity information; and
  sending the first group identity information to a terminal device served by the base station, the first group identity information enabling the terminal device to receive the MBMS in the neighboring cell.

5. The base station according to claim 4, wherein when the program instructions are executed by the processor, the base station is further caused to perform following:
  sending third indication information to the terminal device, wherein the third indication information indicates that the first group identity information of the MBMS in the neighboring cell is the same as the second group identity information of the MBMS in the source cell.

6. The base station according to claim 4, wherein the neighboring cell comprises a target cell, the target cell is determined based on a measurement report reported by the terminal device and is usable to serve the terminal device, and the measurement report comprises a measurement result of each terminal device in an MBMS service group to which the terminal device belongs.

7. A base station comprising:
  a non-transitory memory and a processor, wherein the memory is coupled to the processor; and
  the memory stores program instructions; and when the program instructions are executed by the processor, the base station is caused to perform following:
  receiving request information sent by a source base station, wherein the request information requests, from the base station, group identity information of an multimedia broadcast multicast service (MBMS) in a neighboring cell of the base station; and
  indicating first group identity information of the MBMS in the neighboring cell to the source base station based on the request information, the indicating comprising:

sending first indication information to the source base station when the base station detects that the first group identity information configured for the MBMS exists, wherein the first indication information comprises the first group identity information.

8. The base station according to claim 7, wherein when the program instructions are executed by the processor, the base station is further caused to perform following:

when the base station does not detect group identity information configured for the MBMS, configuring the first group identity information for the MBMS, and sending second indication information to the source base station, wherein the second indication information comprises the first group identity information.

9. The base station according to claim 7, wherein the request information comprises second group identity information and indicates that the second group identity information is group identity information of the MBMS in a source cell; and when the program instructions are executed by the processor, the base station is further caused to perform following:

determining, based on the request information, whether the first group identity information of the MBMS in the neighboring cell is same as the second group identity information; and when the group identity information is the same as the second group identity information, sending third indication information to the source base station, wherein the third indication information indicates that the first group identity information is the same as the second group identity information.

10. The base station according to claim 7, wherein the request information comprises second group identity information and indicates that the second group identity information is group identity information of the MBMS in a source cell; and when the program instructions are executed by the processor, the base station is further caused to perform following:

determining, based on the request information, whether the first group identity information of the MBMS in the neighboring cell is same as the second group identity information;

when the first group identity information is different from the second group identity information, configuring the first group identity information for the MBMS; and sending fourth indication information to the source base station, wherein the fourth indication information comprises the first group identity information.

11. The base station according to claim 7, wherein the first group identity information comprises a group radio network temporary identifier (G-RNTI), or the first group identity information is a temporary mobile group identity (TMGI).

12. The method according to claim 1, wherein the first group identity information of the MBMS in the neighboring cell is requested by the source base station based on terminal device needing to be handed over to the target base station.

13. The method according to claim 3, wherein the measurement report is one of periodic measurement reports reported by the terminal device.

14. The method according to claim 3, wherein the measurement report is reported by the terminal device based on an event occurring.

15. The base station according to claim 4, wherein the first group identity information of the MBMS in the neighboring cell is requested based on terminal device needing to be handed over to the target base station.

16. The base station according to claim 6, wherein the measurement report is one of periodic measurement reports reported by the terminal device.

17. The base station according to claim 6, wherein the measurement report is reported by the terminal device based on an event occurring.

18. The base station according to claim 4, wherein the first group identity information includes a group radio network temporary identifier (G-RNTI) or the first group identity information is a temporary mobile group identity (TMGI).

19. The method according to claim 1, wherein the first group identity information includes a group radio network temporary identifier (G-RNTI).

20. The method according to claim 1, wherein the first group identity information includes a temporary mobile group identity (TMGI).

* * * * *